(12) United States Patent
Yang et al.

(10) Patent No.: US 9,215,674 B2
(45) Date of Patent: Dec. 15, 2015

(54) METHOD FOR SELECTING TRANSPORT FORMAT IN UPLINK MULTIPLE-INPUT MULTIPLE-OUTPUT SYSTEM AND RELATED METHOD AND DEVICE

(71) Applicant: Huawei Technologies Co., Ltd., Shenzhen, Guangdong (CN)

(72) Inventors: Yi Yang, Shanghai (CN); Meng Hua, Shanghai (CN); Shurong Jiao, Shanghai (CN); Wenquan Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/486,549

(22) Filed: Sep. 15, 2014

(65) Prior Publication Data

US 2015/0005028 A1   Jan. 1, 2015

Related U.S. Application Data

(63) Continuation of application No. PCT/CN2013/072702, filed on Mar. 15, 2013.

(30) Foreign Application Priority Data

Mar. 16, 2012   (CN) .......................... 2012 1 0070836

(51) Int. Cl.
*H04B 7/02* (2006.01)
*H04B 7/00* (2006.01)
(Continued)

(52) U.S. Cl.
CPC ............. *H04W 52/36* (2013.01); *H04W 24/08* (2013.01); *H04W 52/16* (2013.01); *H04W 72/02* (2013.01);
(Continued)

(58) Field of Classification Search
CPC ..................................................... H04W 72/12
USPC ............................... 455/101, 525, 524, 562.1
See application file for complete search history.

(56) References Cited

U.S. PATENT DOCUMENTS

| 9,143,213 B2 * | 9/2015 | Xi ............................ H04B 7/06 |
| 2011/0243008 A1 * | 10/2011 | Kim ...................... H04L 1/1893 370/252 |

(Continued)

FOREIGN PATENT DOCUMENTS

| CN | 101656598 A | 2/2010 |
| CN | 101667892 A | 3/2010 |

(Continued)

OTHER PUBLICATIONS

"3$^{rd}$ Generation Partnership Project; Technical Specification Group Radio Access Network; Medium Access Control (MAC) protocol specification (Release 11)," 3GPP TS 25.321, V11.0.0, pp. 1-198, 3$^{rd}$ Generation Partnership Project, Valbonne, France (Dec. 2011).

(Continued)

*Primary Examiner* — Tilahun B Gesesse
(74) *Attorney, Agent, or Firm* — Leydig, Voit & Mayer, Ltd.

(57) ABSTRACT

A method for selecting a transport format in an uplink multiple-input multiple-output system and a related method and a device are used by a user equipment to select a transport format in a case in which the user equipment is in a dual-stream transmission mode of the ULMIMO and inter-stream interference is considered.

20 Claims, 6 Drawing Sheets

(51) Int. Cl.
*H04M 1/00* (2006.01)
*H04W 52/36* (2009.01)
*H04W 72/02* (2009.01)
*H04W 52/16* (2009.01)
*H04W 24/08* (2009.01)
*H04B 7/04* (2006.01)
*H04W 52/34* (2009.01)
*H04W 52/42* (2009.01)

(52) U.S. Cl.
CPC ............ *H04B 7/0404* (2013.01); *H04B 7/0413* (2013.01); *H04W 52/346* (2013.01); *H04W 52/42* (2013.01)

(56) References Cited

U.S. PATENT DOCUMENTS

| | | | |
|---|---|---|---|
| 2012/0099548 | A1 | 4/2012 | Yan et al. |
| 2012/0188960 | A1* | 7/2012 | Hultell ............... H04B 7/0404 370/329 |
| 2012/0263081 | A1 | 10/2012 | Li et al. |
| 2013/0229906 | A1* | 9/2013 | Akkarakaran ........ H04L 5/0044 370/216 |

FOREIGN PATENT DOCUMENTS

| | | |
|---|---|---|
| CN | 101820649 A | 9/2010 |
| CN | 101938786 A | 1/2011 |
| CN | 101997651 A | 3/2011 |
| CN | 102104957 A | 6/2011 |
| EP | 2437565 A1 | 4/2012 |
| EP | 2552153 A1 | 1/2013 |
| WO | 2011127358 A1 | 10/2011 |
| WO | 2012022010 A1 | 2/2012 |

OTHER PUBLICATIONS

"Quality Control of the Secondary Stream for Uplink MIMO with 64QAM," 3GPP TSG RAN WG1 Meeting #68, Dresden, Germany, R1-120344, 3$^{rd}$ Generation Partnership Project, Valbonne, France (Feb. 6-10, 2012).

"Impact on UE for UL MIMO," 3GPP TSG-RAN WG1, Meeting #68, Dresden, Germany, R1-120696, 3rd Generation Partnership Project, Valbonne, France (Feb. 6-10, 2012).

* cited by examiner

METHOD FOR SELECTING TRANSPORT FORMAT IN UPLINK MULTIPLE-INPUT MULTIPLE-OUTPUT SYSTEM AND RELATED METHOD AND DEVICE

CROSS-REFERENCE TO RELATED APPLICATIONS

This application is a continuation of International Patent Application No. PCT/CN2013/072702, filed on Mar. 15, 2013, which claims priority to Chinese Patent Application No. 201210070836.X, filed on Mar. 16, 2012, both of which are hereby incorporated by reference in their entireties.

TECHNICAL FIELD

The present invention relates to the field of mobile communications technologies, and in particular, to a method for selecting a transport format in an uplink multiple-input multiple-output system and a related method and a device.

BACKGROUND

In an uplink multiple-input multiple-output (ULMIMO, Uplink Multiple Input Multiple Output) system, when a user equipment (UE, User Equipment) sends data at each transmission time interval (TTI, Transmission Time Interval), a transport format is selected to send the data to a network side. This transport format is identified by using an enhanced dedicated channel transport format combination indicator (E-TFCI, Enhanced Dedicated Channel Transport Format Combination Indicator). In one TTI, an E-TFCI corresponds to a transmission block size (Transmission Block Size). A mode in which a UE transfers one data block to a base station in a same TTI is referred to as a single-stream transmission mode. A mode in which a UE transfers two data blocks to a base station in a same TTI is referred to a dual-stream transmission mode, where one data block is a primary data block and the other data block is a secondary data block. A data stream corresponding to the primary data block is a primary data stream (primary stream for short), on which a primary precoding vector is used to perform precoding. A data stream corresponding to the secondary data block is a secondary data stream (secondary stream for short), on which a secondary precoding vector is used to perform precoding. A primary pilot and a secondary pilot are respectively transmitted along with the primary data stream and the secondary data stream to estimate an uplink channel.

In the dual-stream transmission mode of the ULMIMO system, the primary data stream and the secondary data stream share a same code channel set and therefore inter-stream interference is generated; however, in the single-stream transmission mode of the ULMIMO system, there is only one data stream and therefore a problem of inter-stream interference does not exist. In a case in which the primary data stream in the dual-stream transmission mode and the data stream in the single-stream transmission mode use same transmit power and experience a same equivalent channel, and receiver end noise is the same, a signal interference noise ratio of the data stream in the single-stream transmission mode is greater than a signal interference noise ratio of the primary data stream in the dual-stream transmission mode.

The prior art provides a selection solution based on an E-TFC (E-TFCI, Enhanced Dedicated Channel-Transport Format Combination, enhanced dedicated channel transport format combination) of a UE side: A UE performs E-TFC selection according to a serving grant (SG, Serving Grant) and a reference E-TFC set that are delivered by a base station, so as to select a corresponding transmission block size. However, in this existing E-TFC selection solution, impact of inter-stream interference is not considered. If this existing data transmission solution is used in the dual-stream transmission mode of the ULMIMO system, a signal interference noise ratio needs to be increased with the help of outer loop power control when the base station demodulates the dual streams. However, a process of outer loop power control is slow; therefore, transmit power on the UE side is wasted and duration in which the base station demodulates the dual streams is prolonged.

The prior art provides another E-TFC selection solution: A base station defines a difference of signal interference noise ratios between the single-stream transmission mode and the dual-stream transmission mode of the ULMIMO system as a channel quality difference caused by inter-stream interference. This existing channel quality difference depends on a receiving environment, and also depends on a base station receiver algorithm. The base station delivers this channel quality difference to a UE and the UE performs E-TFC selection based on this channel quality difference, so as to select a corresponding transmission block size. In a specific implementation of delivery of a channel quality difference, there are the following two implementation solutions:

One solution is that, in the single-stream transmission mode and the dual-stream transmission mode of the ULMIMO system, the base station delivers two reference E-TFC sets. The first set is a reference E-TFC set used in the prior art, which is used for E-TFC selection in the single-stream transmission mode; the other set is used for E-TFC selection for the primary data stream in the dual-stream transmission mode. Then a difference between these two reference E-TFC sets is a channel quality difference. When the UE performs E-TFC selection for the primary data stream, the UE needs to consider this channel quality difference. In this solution, the base station needs to deliver an extra reference E-TFC set for exclusive use by the dual-stream transmission mode. If the base station chooses to deliver the extra reference E-TFC set at a high layer, the delivery is performed at a low frequency. Because inter-stream interference depends on the receiving environment, the delivery at the high layer may not adapt to a change of the receiving environment and cannot reflect a magnitude of inter-stream interference in a current environment, thereby causing a lower feasibility of this solution. If the base station chooses to deliver this extra reference E-TFC set at a physical layer and increase the delivery frequency, because an amount of information about the reference E-TFC set is large, much downlink channel resource needs to be occupied.

The other solution is that, the base station delivers only one reference E-TFC set and the UE uses a same reference E-TFC set, that is, the original reference E-TFC set to perform E-TFC selection in the single-stream transmission mode and the dual-stream transmission mode of the ULMIMO system. However, the base station also sends a grant offset (GO, Grant Offset). This grant offset serves as a channel quality difference and is used to correct an E-TFCI that is selected for the primary data stream in the dual-stream transmission mode. This grant offset does not change transmit power of the primary data stream and is a fixed value delivered by the base station. When the UE performs E-TFC selection for the primary data stream, the UE needs to consider this channel quality difference. In this solution, the UE only needs to deliver one GO in the dual-stream transmission mode. Because an amount of information about the GO is small, the GO may be delivered at a high frequency at the physical layer.

However, when the transmit power of the primary data stream is different, the channel quality difference caused by inter-stream interference is different. The grant offset delivered in this solution is unchanged; therefore, this solution is not applied to the E-TFC selection in the dual-stream transmission mode of the ULMIMO system either.

SUMMARY

Embodiments of the present invention provide a method for selecting a transport format in an uplink multiple-input multiple-output system and a related method and a device, which are used by a user equipment to select a transport format in a case in which the user equipment is in a dual-stream transmission mode of the uplink multiple-input multiple-output (ULMIMO) system and inter-stream interference is considered. To achieve the foregoing purpose, the embodiments of the present invention provide the following technical solutions:

According to one aspect, an embodiment of the present invention provides a method for selecting a transport format in an uplink multiple-input multiple-output system, where the method includes:

receiving, by a user equipment UE, a reference E-TFC set and a primary-stream channel quality difference in a dual-stream transmission mode that are sent by a base station;

acquiring, by the user equipment according to a primary-stream serving grant SG allocated by the base station to the user equipment within a transmission time interval TTI, a first transmit power offset $A_{ed}^2$ of the primary stream granted by the base station;

when transmit power of the primary stream is obtained according to primary-stream transmit power granted by the base station, acquiring, by the user equipment, when inter-stream interference is considered and a transmit power offset of the primary stream is $A_{ed}^2$, a first transport format combination indicator E-TFCI$_1$ of the primary stream according to the primary-stream channel quality difference and the $A_{ed}^2$;

when the transmit power of the primary stream is obtained according to remaining transmit power, which is calculated according to a limit value of maximum transmit power of the user equipment, calculating, by the user equipment, a second transmit power offset $A'_{ed}^2$ of the primary stream according to the remaining transmit power, and calculating, when inter-stream interference is considered and the transmit power offset of the primary stream is $A'_{ed}^2$, an equivalent transmit power offset $A'_{edm1}^2$, of the primary stream according to the primary-stream channel quality difference, the $A_{ed}^2$, and the $A'_{ed}^2$; and calculating, by the user equipment, when inter-stream interference is considered and the transmit power offset of the primary stream is $A'_{ed}^2$, a second transport format combination indicator E-TFCI'$_1$ of the primary stream according to the reference E-TFC set and the $A'_{edm1}^2$; and selecting, by the user equipment from the E-TFCI$_1$ and the E-TFCI'$_1$, an indicator, which has a smaller value, as a third transport format combination indicator E-TFCI''$_1$, corresponding to a transport format used by the user equipment to send uplink data, of the primary stream.

According to another aspect, an embodiment of the present invention provides a method for sending a primary-stream channel quality difference, where the method includes:

acquiring, by a base station, when inter-stream interference is not considered, a balanced signal interference noise ratio SINR$_c$ of a dedicated physical control channel DPCCH;

acquiring, by the base station, according to a primary-stream serving grant SG allocated to a user equipment within a transmission time interval TTI, a first transmit power offset $A_{ed}^2$ of the primary stream granted by the base station;

calculating, by the base station, according to the $A_{ed}^2$, and SINR$_c$ the inter-stream interference is not considered, a signal interference noise ratio SINR$_s$ of the primary stream in a dual-stream transmission mode of an ULMIMO system;

acquiring, by the base station, when inter-stream interference is considered, a signal interference noise ratio SINR$_1$ of the primary-stream in the dual-stream transmission mode of the ULMIMO system;

acquiring, by the base station, the primary-stream channel quality difference according to the SINR$_s$ and the SINR$_1$ where the primary-stream channel quality difference is a primary-stream grant offset $\delta_1$; and sending, by the base station to the user equipment, a reference E-TFC set and the primary-stream channel quality difference in the dual-stream transmission mode of the uplink multiple-input multiple-output (ULMIMO) system.

According to still another aspect, an embodiment of the present invention provides a method for sending a primary-stream channel quality difference, where the method includes:

acquiring, by a base station, when inter-stream interference is not considered, a balanced signal interference noise ratio SINR$_c$ of a dedicated physical control channel DPCCH;

acquiring, by the base station, according to a primary-stream serving grant SG allocated to a user equipment within a transmission time interval TTI, a first transmit power offset $A_{ed}^2$ of the primary stream granted by the base station;

calculating, by the base station, according to the $A_{ed}^2$ and the SINR$_c$ when inter-stream interference is not considered, a signal interference noise ratio SINR$_s$ of the primary stream in a dual-stream transmission mode of the ULMIMO system;

calculating, by the base station, according to a reference E-TFC set and the $A_{ed}^2$, a fourth transport format combination indicator E-TFCI$_s$ corresponding to the SINR$_s$;

acquiring, by the base station, when inter-stream interference is considered, a signal interference noise ratio SINR$_1$ of the primary stream in the dual-stream transmission mode of the ULMIMO system;

calculating, by the base station, when inter-stream interference is considered and a transmit power offset of the primary stream is $A_{ed}^2$, an equivalent transmit power offset $A_{edm1}^2$ of the primary stream according to the SINR$_1$ and the SINR$_c$;

calculating, by the base station, according to the $A_{edm1}^2$ and the reference E-TFC set, a first transport format combination indicator E-TFCI$_1$, corresponding to the SINR$_1$, of the primary stream;

acquiring, by the base station, the primary-stream channel quality difference according to the E-TFCI$_s$ and the E-TFCI$_1$, where the primary-stream channel quality difference is a primary-stream E-TFCI offset $\delta_{f1}$; and sending, by the base station to the user equipment, the reference E-TFC set and the primary-stream channel quality difference in the dual-stream transmission mode of the uplink multiple-input multiple-output (ULMIMO) system.

According to yet another aspect, an embodiment of the present invention provides a user equipment, where the user equipment includes:

a receiving unit, configured to receive a reference E-TFC set and a primary-stream channel quality difference in a dual-stream transmission mode of an uplink multiple-input multiple-output (ULMIMO) system that are sent by a base station;

a first acquiring unit, configured to acquire, according to a primary-stream serving grant SG allocated to the user equipment by the base station within a transmission time interval TTI, a first transmit power offset $A_{ed}^2$ of the primary stream granted by the base station;

a second acquiring unit, configured to: when transmit power of the primary stream is obtained according to primary-stream transmit power granted by the base station, acquire, when inter-stream interference is considered and a transmit power offset of the primary stream is $A_{ed}^2$, a first transport format combination indicator E-TFCI$_1$ of the primary stream according to the primary-stream channel quality difference and the $A_{ed}^2$;

a third acquiring unit, configured to, when the transmit power of the primary stream is obtained according to remaining transmit power, which is calculated according to a limit value of maximum transmit power of the user equipment, calculate a second transmit power offset $A'_{ed}^2$ of the primary stream according to the remaining transmit power; calculate, when inter-stream interference is considered and the transmit power offset of the primary stream is $A'_{ed}^2$, an equivalent transmit power offset $A'_{edm1}^2$ of the primary stream according to the primary-stream channel quality difference, the $A'_{edm1}^2$, and the $A'_{ed}^2$; and calculate, when inter-stream interference is considered and the transmit power offset of the primary stream is $A'_{ed}^2$, a second transport format combination indicator E-TFCI'$_1$ of the primary stream according to the reference E-TFC set and the $A'_{edm1}^2$; and a selecting unit, configured to select from the E-TFCI$_1$ and the E-TFCI'$_1$ an indicator, which has a smaller value, as a third transport format combination indicator, corresponding to a transport format used by the user equipment to send uplink data, of the primary stream.

An embodiment of the present invention further provides a base station, where the base station includes:

a first acquiring unit, configured to acquire, when inter-stream interference is not considered, a balanced signal interference noise ratio SINR$_c$ of a dedicated physical control channel DPCCH;

a second acquiring unit, configured to acquire, according to a primary-stream serving grant SG allocated to a user equipment within a transmission time interval TTI, a first transmit power offset $A_{ed}^2$ of the primary stream granted by the base station;

a calculating unit, configured to calculate, according to the $A_{ed}^2$ and the SINR$_c$ when inter-stream interference is not considered, a signal interference noise ratio SINR$_s$, of the primary stream in a dual-stream transmission mode of an ULMIMO system;

a third acquiring unit, configured to acquire, when inter-stream interference is considered, a signal interference noise ratio SINR$_1$ of the primary stream in the dual-stream transmission mode of the ULMIMO system;

a fourth acquiring unit, configured to acquire a primary-stream channel quality difference according to the SINR$^s$ and the SINR$_1$, where the primary-stream channel quality difference is a primary-stream grant offset $\delta_1$; and a sending unit, configured to send, to the user equipment, a reference E-TFC set and the primary-stream channel quality difference in the dual-stream transmission mode of the uplink multiple-input multiple-output (ULMIMO) system.

An embodiment of the present invention further provides a base station, where the base station includes:

a first acquiring unit, configured to acquire, when inter-stream interference is not considered, a balanced signal interference noise ratio SINR$_c$ of a dedicated physical control channel DPCCH;

a second acquiring unit, configured to acquire, according to a primary-stream serving grant SG allocated to a user equipment within a transmission time interval TTI, a first transmit power offset $A_{ed}^2$ of the primary stream granted by the base station;

a first calculating unit, configured to calculate, according to the $A_{ed}^2$ and the SINR$_c$ when inter-stream interference is not considered, a signal interference noise ratio SINR$_s$ of the primary stream in a dual-stream transmission mode of an ULMIMO system;

a second calculating unit, configured to calculate, according to a reference E-TFC set and the $A_{ed}^2$, a fourth transport format combination indicator E-TFCI$_s$, corresponding to the SINR$_s$, of the primary stream;

a third acquiring unit, configured to acquire, when inter-stream interference is considered, a signal interference noise ratio SINR$_1$ of the primary stream in the dual-stream transmission mode of the ULMIMO system;

a third calculating unit, configured to calculate, when inter-stream interference is considered and a transmit power offset of the primary stream is $A_{ed}^2$, an equivalent transmit power offset $A_{edm1}^2$ of the primary stream according to the SINR$_1$ and SINR$_c$;

a fourth calculating unit, configured to calculate, according to the $A_{edm1}^2$ and the reference E-TFC set, a first transport format combination indicator E-TFCI$_1$, corresponding to the SINR$_1$, of the primary stream;

a fourth acquiring unit, configured to acquire a primary-stream channel quality difference according to the E-TFCI$_s$ and the E-TFCI$_1$, where the primary-stream channel quality difference is a primary-stream E-TFCI offset $\delta_{t1}$; and a sending unit, configured to send, to the user equipment, the reference E-TFC set and the primary-stream channel quality difference in the dual-stream transmission mode of the uplink multiple-input multiple-output (ULMIMO) system.

It can be learned from the foregoing technical solutions that the embodiments of the present invention have the following advantages:

A user equipment receives a reference E-TFC set and a primary-stream channel quality difference in a dual-stream transmission mode of an ULMIMO system that are sent by the base station. Then the user equipment acquires, according to a primary-stream serving grant allocated to the user equipment by the base station within a transmission time interval TTI, a first transmit power offset $A_{ed}^2$ of the primary stream granted by the base station. Finally, the user equipment calculates, when inter-stream interference is considered, an E-TFCI$_1$ and an E-TFCI'$_1$ separately according to whether transmit power of the primary stream is based on primary-stream transmit power granted by the base station or is based on remaining transmit power. Then, based on the E-TFCI$_1$ and the E-TFCI'$_1$, and the user equipment selects an indicator, which has a smaller value, as an E-TFCI"$_1$, and the user equipment selects a transmission block size that corresponds to the E-TFCI. This transmission block size can be applied to the dual-stream transmission mode of the ULMIMO system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings.

DESCRIPTION OF EMBODIMENTS

Embodiments of the present invention provide a method for selecting an E-TFC and a related method and a device, which are used for a user equipment to transmit data to a base station in a dual-stream transmission mode of an uplink multiple-input multiple-output (ULMIMO) system.

To make the objectives, features, and advantages of the present invention clearer and more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments derived by a person skilled in the art based on the embodiments of the present invention shall fall within the protection scope of the present invention.

In one TTI, an E-TFCI corresponds to one transmission block size (Transmission Block Size). A mode in which a UE transfers one data block to a base station in a same TTI is referred to as a single-stream transmission mode. A mode in which a UE transfers two data blocks to a base station in a same TTI is referred to a dual-stream transmission mode, where one data block is a primary data block and the other data block is a secondary data block. A data stream corresponding to the primary data block is a primary data stream (primary stream for short), on which a primary precoding vector is used to perform precoding. A data stream corresponding to the secondary data block is a secondary data stream (secondary stream for short), on which a secondary precoding vector is used to perform precoding. A primary pilot and a secondary pilot are respectively transmitted along with the primary data stream and the secondary data stream to estimate an uplink channel. The primary pilot is carried on a dedicated physical control channel (DPCCH, Dedicated Physical Control Channel) and the secondary pilot is carried on a secondary dedicated physical control channel (S-DPCCH, Secondary-Dedicated Physical Control Channel). The primary data stream is carried on an enhanced dedicated physical data channel (E-DPDCH, Enhanced Dedicated Physical Data Channel) and the secondary data stream is carried on a secondary enhanced dedicated physical data channel (S-E-DPDCH, Secondary-Enhanced-Dedicated Physical Data Channel).

Figure 1:
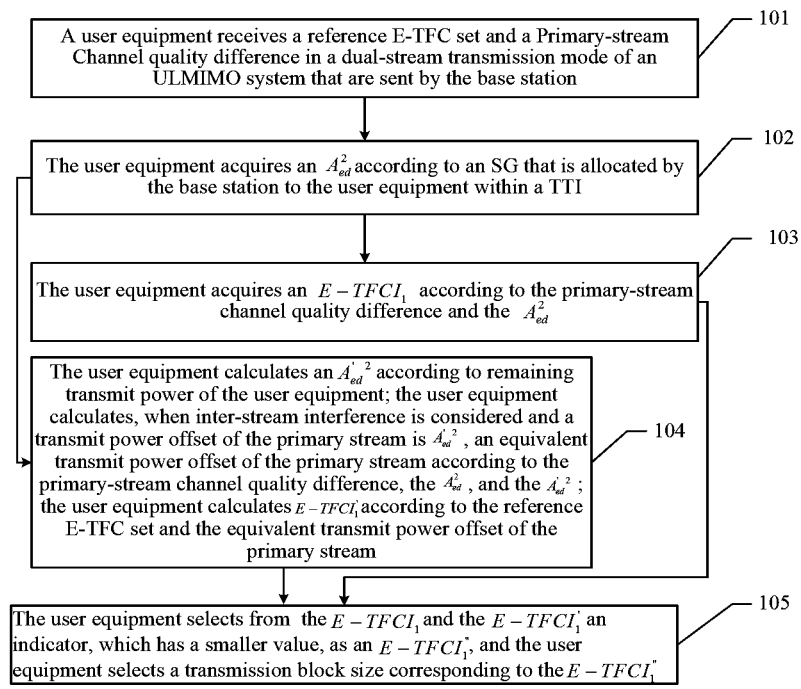
FIG. 1 is a schematic diagram of a method for selecting a transport format in an uplink multiple-input multiple-output system according to an embodiment of the present invention.

Referring to FIG. 1, an embodiment of the present invention provides a method for selecting a transport format in an uplink multiple-input multiple-output system, where the method includes:

101: A user equipment (UE, User Equipment) receives a reference E-TFC set and a primary-stream channel quality difference in a dual-stream transmission mode of an uplink multiple-input multiple-output (ULMIMO, Uplink Multiple Input Multiple Output) system that are sent by the base station.

Figure 2:
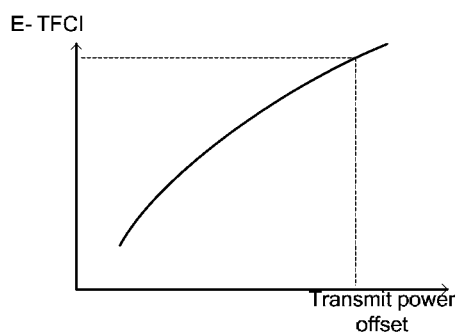
FIG. 2, FIG. 3, and FIG. 4 are schematic diagrams of a reference E-TFC set according to embodiments of the present invention.

In this embodiment of the present invention, the user equipment receives, from the base station side, the reference E-TFC set and the primary-stream channel quality difference in the dual-stream transmission mode of the ULMIMO system. The reference E-TFC set represents a correspondence between a transmit power offset and an E-TFCI. A curve shown in FIG. 2 is a reference E-TFCI set, where the horizontal coordinate is a transmit power offset and the vertical coordinate is an E-TFCI. This reference E-TFC set is delivered by the base station to the user equipment from a high layer. By using the reference E-TFC set, the user equipment may select a corresponding E-TFCI according to the transmit power offset. The primary-stream channel quality difference represents a channel quality difference of the primary stream, in comparison with a single-stream transmission mode, under a transmit power offset of the primary stream granted by the base station. The base station delivers the primary-stream channel quality difference to the user equipment, and the user equipment needs to perform E-TFC selection based on this primary-stream channel quality difference so as to implement data transmission.

It should be noted that, in this embodiment of the present invention, the primary-stream channel quality difference may be specifically embodied by a primary-stream grant offset (GO, Grant Offset) or a primary-stream E-TFCI offset (EO, E-TFCI Offset). The primary-stream grant offset refers to an offset between transmit power of the primary stream in the dual-stream transmission mode of the ULMIMO system and primary-stream transmit power granted by the base station. A symbol "$\delta_1$" is used herein to represent the primary-stream grant offset. The primary-stream E-TFCI offset refers to an E-TFCI offset between an E-TFCI in the dual-stream transmission mode of the ULMIMO system selected for the primary stream and an E-TFCI that is of the primary stream and is granted by the base station. A symbol "$\delta_{t1}$" is used herein to represent the primary-stream E-TFCI offset.

It should be noted that, the user equipment may specifically receive the primary-stream channel quality difference in the dual-stream transmission mode of the ULMIMO system that is sent by the base station by using a physical layer.

102: The user equipment acquires, according to a primary-stream serving grant (SG, Serving Grant) allocated by the base station to the user equipment within a transmission time interval TTI (TTI, Transport Time Interval), a first transmit power offset $A_{ed}^2$ of the primary stream granted by the base station.

In this embodiment of the present invention, the base station generally delivers the primary-stream serving grant or a sum of serving grants of the dual streams to the user equipment. If a sum of serving grants of the dual streams is delivered, the user equipment may convert the sum into the primary-stream serving grant of the primary stream. Within one TTI, the user equipment may acquire, according to the SG, the first transmit power offset $A_{ed}^2$ of the primary stream granted by the base station. A symbol "$A_{ed}^2$" is used herein to represent the first transmit power offset of the primary stream granted by the base station.

Then, when the transmit power of the primary stream is obtained according to the primary-stream transmit power granted by the base station, step 103 is performed. When the transmit power of the primary stream is obtained according to remaining transmit power, which is calculated according to a limit value of maximum transmit power of the user equipment, step 104 is performed. Step 103 and step 104 are steps that need to be performed under trigger conditions of two different dimensions, where the trigger conditions are maximum transmit power granted by the base station and maximum transmit power that can be supported by the user equipment itself. The two steps are in a paralleled and co-existing relationship.

103: The user equipment acquires, when inter-stream interference is considered and a transmit power offset of the primary stream is $A_{ed}^2$, a first transport format combination indicator E-TFCI$_1$ of the primary stream according to the primary-stream channel quality difference and the $A_{ed}^2$.

After the user equipment receives the primary-stream channel quality difference from the base station, when the transmit power offset of the primary stream is the first transmit power offset $A_{ed}^2$ of the primary stream granted by the base station, the user equipment acquires, when inter-stream interference is considered and the transmit power offset of the primary stream is $A_{ed}^2$, the first transport format combination indicator E-TFCI$_1$ of the primary stream according to the primary-stream channel quality difference and the $A_{ed}^2$. A symbol "E-TFCI$_1$" is used herein to represent the first transport format combination indicator of the primary stream when inter-stream interference is considered and the transmit power offset of the primary stream is $A_{ed}^2$. It should be noted that, if non-scheduling data is also transmitted along with scheduling data, in addition to a maximum scheduling data block size that is calculated according to the serving grant delivered by the base station, the user equipment further needs to consider a non-scheduling data block size, where E-TFCI$_1$ is a sum of both the maximum scheduling data block size and the non-scheduling data block size.

As described above, when the primary-stream channel quality difference is the primary-stream grant offset $\delta_1$, the $\delta_1$ is a linear value. If the grant offset of the primary stream is a log value $\delta_{l1}$, then the log value $\delta_{l1}$ is converted into the linear value $\delta_1$ according to a formula $$\delta_1 = 10^{\frac{\delta_{l1}}{10}};$$

or if the primary-stream grant offset is an offset in a serving grant SG quantization table, the offset is converted into the linear value $\delta_1$.

For step 103, the following steps may be specifically included:

A1: The user equipment calculates, when inter-stream interference is considered and the transmit power offset of the primary stream is $A_{ed}^2$, an equivalent transmit power offset $A_{edm1}^2$ of the primary stream by using the following formula (1):

$$A_{edm1}^2 = \frac{A_{ed}^2}{\delta_1} \qquad (1)$$

A2: The user equipment acquires, when inter-stream interference is considered and the transmit power offset of the primary stream is $A_{ed}^2$, the E-TFCI$_1$ of the primary stream according to the reference E-TFC set and the $A_{edm1}^2$.

For step A1, a symbol "$A_{edm1}^2$" is used to represent the equivalent transmit power offset of the primary stream when inter-stream interference is considered and the transmit power offset of the primary stream is $A_{ed}^2$; a symbol "SINR$_s$" to represent a signal interference noise ratio of the primary stream when inter-stream interference is not considered in the dual-stream transmission mode of the ULMIMO system; a symbol "SINR$_1$" is used to represent a signal interference noise ratio of the primary stream when inter-stream interference is considered in the dual-stream transmission mode of the ULMIMO system; and a symbol "SINR$_c$" is used to represent a balanced signal interference noise ratio of a DPCCH when inter-stream interference is not considered. Then, (1) is deduced from a formula (1a) as follows:

$$\delta_1 = \frac{SINR_s}{SINR_1} = \frac{A_{ed}^2 \times SINR_c}{A_{edm1}^2 \times SINR_c} \Rightarrow A_{edm1}^2 = \frac{A_{ed}^2}{\delta_1} \qquad (1a)$$

Figure 3:
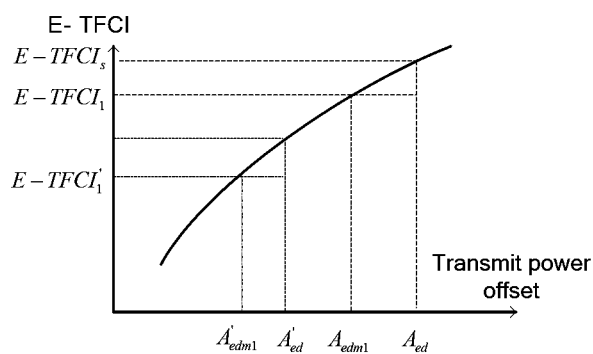

For step A2, as shown in FIG. 3, the curve shown in the figure is all possible E-TFCIs that can be obtained (as described in Table 1) with reference to the reference E-TFC set. An E-TFC set is obtained by using the reference E-TFC set by means of an interpolation or extrapolation formula; the $A_{edm1}^2$ is obtained by means of step A1; and then comparison is performed between the $A_{edm1}^2$ and horizontal coordinates (transmit power offsets) of all points on the curve, so as to obtain a maximum E-TFC that can be supported by the $A_{edm1}^2$. A vertical coordinate of this E-TFC is the E-TFCI$_1$. A person skilled in the art should know that, the UE side calculates a data block size corresponding to the E-TFCI by means of the following interpolation or extrapolation formula and according to the serving grant SG and the reference E-TFC set.

E-DPDCH power extrapolation formula:

(data block size =)

$$\left\lfloor K_{e,ref,m} \cdot \frac{\text{Serving\_Grant}}{L_{e,ref,m} \cdot A_{ed,m}^2 \cdot 10^{\Delta harq/10}} \right\rfloor$$

E-DPDCH power interpolation formula:

(data block size =)

$$\left\lfloor K_{e,ref,m} + \frac{\left(\frac{\text{Serving\_Grant}}{10^{\Delta harq/10}} - L_{e,ref,m} \cdot A_{ed,m}^2\right)(K_{e,ref,m+1} - K_{e,ref,m})}{L_{e,ref,m+1} \cdot A_{ed,m+1}^2 - L_{e,ref,m} \cdot A_{ed,m}^2} \right\rfloor$$

where, Serving_Grant is a serving grant that may be used by this TTI that is delivered by a network side through an E-AGCH channel and an E-RGCH channel; $A_{ed,m}$ represents an amplitude offset of an $m^{th}$ reference E-TFCI; $L_{e,ref,m}$ represents the number of E-DPDCH channels that are used by the $m^{th}$ reference E-TFCI; and $K_{e,ref,m}$ represents a transmission block size corresponding to the $m^{th}$ reference E-TFCI.

For step A2, the following method may also be used: the $A_{edm1}^2$ is obtained by means of step A1; a data block size corresponding to the $A_{edm1}^2$ is obtained by using the reference E-TFC set by means of an interpolation or extrapolation formula; and comparison is performed between the data block size and all possible E-TFCIs that can be obtained (as described in Table 1), so as to obtain a maximum E-TFCI$_1$ that can be supported.

When the primary-stream channel quality difference is the primary-stream E-TFCI offset $\delta_{l1}$, for step 103, the following steps may be specifically included:

B1: The user equipment calculates, when inter-stream interference is not considered, a fourth transport format combination indicator E-TFCI$_s$ of the primary stream according to the reference E-TFC set and the $A_{ed}^2$.

B2: The user equipment calculates, when inter-stream interference is considered and the transmit power offset of the primary stream is $A_{ed}^2$, the E-TFCI$_1$ by using the following formula (2):

$$\text{E-TFCI}_1 = \text{E-TFCI}_s - \delta_{t1} \quad (2)$$

For step B1, a symbol "E-TFCI$_s$" is used to represent the fourth transport format combination indicator of the primary stream when inter-stream interference is not considered. As shown in FIG. 3, with reference to the reference E-TFC set, $A_{ed}^2$ is a horizontal coordinate of the curve of the reference E-TFC set. Then, by using this curve, a vertical coordinate may be obtained and this vertical coordinate is the E-TFCI$_s$. For step B2, when the primary-stream channel quality difference is the E-TFCI offset $\delta_{t1}$ of the primary stream, the E-TFCI$_1$ may be obtained according to E-TFCI$_1$=E-TFCI$_s$-$\delta_{t1}$. For details, reference may be made to a description part of step A2.

104: The user equipment calculates a second transmit power offset $A'^2_{ed}$ of the primary stream according to the remaining transmit power of the user equipment. The user equipment calculates, when inter-stream interference is considered and the transmit power offset of the primary stream is $A'^2_{ed}$, an equivalent transmit power offset $A'^2_{edm1}$ of the primary stream according to the primary-stream channel quality difference, the $A_{ed}^2$, and the $A'^2_{ed}$. The user equipment calculates, when inter-stream interference is considered and the transmit power offset of the primary stream is $A'^2_{ed}$, a second transport format combination indicator E-TFCI'$_1$ of the primary stream according to the reference E-TFC set and the $A'^2_{edb1}$.

In this embodiment of the present invention, a symbol "$A'^2_{ed}$" is used to represent the second transmit power offset of the primary stream and calculated according to the remaining transmit power of the user equipment; a symbol "$A'^2_{edm1}$" is used to represent the equivalent transmit power offset of the primary stream when inter-stream interference is considered and the transmit power offset of the primary stream is $A'^2_{ed}$; and a symbol "E-TFCI'$_1$" is used to represent the second transport format combination indicator of the primary stream when inter-stream interference is considered and the transmit power offset of the primary stream is $A'^2_{ed}$. If the transmit power of the primary stream is equal to that of a secondary stream, both the transmit power offset of the primary stream and a transmit power offset of the secondary stream, which are calculated according to the remaining transmit power of the user equipment, should be $A'^2_{ed}$.

When the primary-stream channel quality difference is the primary-stream grant offset $\delta_1$, that the user equipment calculates, when inter-stream interference is considered and the transmit power offset of the primary stream is $A'^2_{ed}$, an equivalent transmit power offset $A'^2_{edm1}$ of the primary stream according to the primary-stream channel quality difference, the $A_{ed}^2$, and the $A'^2_{ed}$ specifically includes the following:

The user equipment calculates, when inter-stream interference is considered and the transmit power offset of the primary stream is $A'^2_{ed}$, the equivalent transmit power offset $A'^2_{edm1}$ of the primary stream by using the following formula (3):

$$A'^2_{edm1} = \frac{A_{ed}^2 A'^2_{ed}}{A_{ed}^2 + A'^2_{ed}(\delta_1 - 1)} \quad (3)$$

It should be noted that, for implementation of the manner (3), a specific deducing process on the user equipment side may be as follows:

The symbol "SINR$_s$" is used to represent a signal interference noise ratio of the primary stream when inter-stream interference is not considered in the dual-stream transmission mode of the ULMIMO system; the symbol "SINR$_1$" to represent a signal interference noise ratio of the primary stream when inter-stream interference is considered in the dual-stream transmission mode of the ULMIMO system; and the symbol "SINR$_c$" is used to represent a balanced signal interference noise ratio of a DPCCH when inter-stream interference is not considered. Then, SINR$_s$ is represented by using a formula (3a) as follows:

$$SINR_s = \frac{A_{ed}^2 P_c |g_{11}|^2}{\sigma_1^2} = A_{ed}^2 \times SINR_c \quad (3a)$$

where, a symbol "$g_{11}$" is used to represent a channel between a port through which the user equipment sends a primary stream and a port through which the base station receives a primary stream; a symbol "$\sigma_1^2$" is used to represent balanced equivalent noise power, which is of a primary pilot and is of a DPCCH, within a transmission time interval, where the balanced equivalent noise power is estimated by the base station; and a symbol "$P_c$" is used to represent transmit power, which is of a primary pilot and is of a DPCCH, within a transmission time interval.

When inter-stream interference is considered, it is assumed that the transmit power of the secondary stream is equal to the transmit power of the primary stream, then SINR$_1$ is represented by using a formula (3b) as follows:

$$SINR_1 = \frac{A_{ed}^2 P_c |g_{11}|^2}{\sigma_1^2 + A_{ed}^2 P_c |g_{12}|^2} \quad (3b)$$

where, a symbol "$g_{12}$" is used to represent a channel between a port through which the user equipment sends a secondary stream and a port through which the base station receives a primary stream.

When the primary-stream channel quality difference is the primary-stream grant offset $\delta_1$, the $\delta_1$ is a linear value. If the primary-stream grant offset is a log value $\delta_{l1}$, then the log value $\delta_{l1}$ is converted into the linear value $\delta_1$ according to the formula $$\delta_1 = 10^{\frac{\delta_{l1}}{10}},$$

and the $\delta_1$ is represented by using a formula (3c) as follows:

$$\delta_1 = \frac{SINR_s}{SINR_1} = \frac{\sigma_1^2 + A_{ed}^2 P_c |g_{12}|^2}{\sigma_1^2} \Rightarrow \frac{P_c |g_{12}|^2}{\sigma_1^2} = \frac{\delta_1 - 1}{A_{ed}^2} \quad (3c)$$

It is assumed that the transmit power of the primary stream is equal to that of the secondary stream, both the transmit power offset of the primary stream and that of the secondary stream, which are calculated according to the remaining transmit power of the user equipment, are $A'_{ed}{}^2$. Meanwhile, it is assumed that balancing processing on the base station side does not change when transmit power of the user equipment of the ULMIMO system changes, then a signal interference noise ratio $SINR'_1$ of the primary stream is represented by using a formula (3d) as follows:

$$SINR'_1 = \frac{A'^2_{ed} P_c |g_{11}|^2}{\sigma_1^2 + A'^2_{ed} P_c |g_{12}|^2} \quad (3d)$$

Additionally, the $SINR'_1$ may be represented by using a formula (3e) as follows:

$$SINR'_1 = \frac{A'^2_{edm1} P_c |g_{11}|^2}{\sigma_1^2} = A'^2_{edm1} \times SINR_c \quad (3e)$$

Then the two formulas (3d) and (3e) are definitely the same, and the following formula (3f) is obtained:

$$\frac{1}{A'^2_{edm1}} = \frac{1}{A'^2_{ed}} + \frac{P_c |g_{12}|^2}{\sigma_1^2} \quad (3f)$$

Then the formula (3c) is substituted into the formula (3f), and the following formula (3) may be obtained:

$$A'^2_{edm1} = \frac{A^2_{ed} A'^2_{ed}}{A^2_{ed} + A'^2_{ed}(\delta_1 - 1)} \quad (3)$$

When the primary-stream channel quality difference is the primary-stream E-TFCI offset $\delta_{t1}$, that the user equipment calculates, when inter-stream interference is considered and the transmit power offset of the primary stream is $A'_{ed}{}^2$, an equivalent transmit power offset $A'_{edm1}{}^2$ of the primary stream according to the primary-stream channel quality difference, the $A_{ed}{}^2$, and the $A'_{ed}{}^2$ includes the following steps:

C1: The user equipment calculates, when inter-stream interference is not considered, the fourth transport format combination indicator $E\text{-}TFCI_s$ of the primary stream according to the reference E-TFC set and the $A_{ed}{}^2$.

C2: The user equipment calculates, when inter-stream interference is considered and the transmit power offset of the primary stream is $A_{ed}{}^2$, the first transport format combination indicator $E\text{-}TFCI_1$ of the primary stream by using the following formula (4):

$$E\text{-}TFCI_1 = E\text{-}TFCI_s - \delta_{t1} \quad (4)$$

C3: The user equipment calculates, when inter-stream interference is considered and the transmit power offset of the primary stream is $A_{ed}{}^2$, the equivalent transmit power offset $A_{edm1}{}^2$ of the primary stream according to the reference E-TFC set and the $E\text{-}TFCI_1$.

C4: The user equipment calculates the primary-stream grant offset $\delta_1$ by using the following formula (5):

$$\delta_1 = \frac{A^2_{ed}}{A^2_{edm1}} \quad (5)$$

C5: The user equipment calculates, when inter-stream interference is considered and the transmit power offset of the primary stream is $A'_{ed}{}^2$, the equivalent transmit power offset $A'_{edm1}{}^2$ of the primary stream by using the foregoing manner (3):

$$A'^2_{edm1} = \frac{A^2_{ed} A'^2_{ed}}{A^2_{ed} + A'^2_{ed}(\delta_1 - 1)}.$$

After the user equipment obtains the $A'_{edm1}{}^2$, the user equipment may obtain the $E\text{-}TFCI'_1$ according to the reference E-TFC set and the $A'_{edm1}{}^2$. For example, as shown in FIG. 3, with reference to the reference E-TFC set, the $A'_{edm1}{}^2$ is a horizontal coordinate of the curve of the reference E-TFC set. Then, by using this curve, a vertical coordinate may be obtained and this vertical coordinate is the $E\text{-}TFCI'_1$. For details, reference may be made to a description part of step A2.

After step 103 or 104 is performed, then steps 105 and 106 need to be performed:

105: After the user equipment acquires the $E\text{-}TFCI_1$ and the $E\text{-}TFCI'_1$, the user equipment selects from the $E\text{-}TFCI_1$ and the $E\text{-}TFCI'_1$ an indicator, which has a smaller value, as the E-TFCI, and the user equipment selects a transmission block size corresponding to the E-TFCI.

In this embodiment of the present invention, after the user equipment obtains the $E\text{-}TFCI_1$ by using step 103, and obtains the $E\text{-}TFCI'_1$ by using step 104, the user equipment selects from the $E\text{-}TFCI_1$ and the $E\text{-}TFCI'_1$ an indicator, which has a smaller value, as a third transport format combination indicator $E\text{-}TFCI''_1$ of the primary stream corresponding to a transport format used by the user equipment to send uplink data, and the user equipment selects a transmission block size corresponding to the $E\text{-}TFCI''_1$ transport format when sending uplink data.

For example, the base station calculates a maximum scheduling data block size a of the primary stream according to the delivered primary-stream serving grant SG. If there is also non-scheduling data and a non-scheduling data block size is b, then non-scheduling data is transmitted along with scheduling data and a total data block size of data that needs to be sent by the user equipment in the current TTI is A=a+b, which corresponds to a transmission block size of the $E\text{-}TFCI_1$. It is assumed that non-scheduling data does not exist, then the maximum scheduling data block size a corresponds to the transmission block size of the $E\text{-}TFCI_1$. A user equipment calculates the remaining transmit power according to the limit value of the maximum transmit power, where this remaining transmit power may be used to transmit a data stream, and the terminal then calculates, according to the remaining transmit power, a maximum transmission block size B that may be supported by the current TTI and corresponds to the $E\text{-}TFCI'_1$. The finally selected transmission block size is TBS=min(A, B). If A is greater than B (which is a power limited case), then a scheduling data amount in A is reduced so that transmission is performed according the size B.

It should be noted that, in this embodiment of the present invention, the $E\text{-}TFCI''_1$ and the TB size are in a positively correlated relationship. That is, a greater $E\text{-}TFCI''_1$ acquired by the user equipment indicates a larger TB size that may be selected. For example, the following Table 1 describes a correspondence between the E-TFCI"$_1$ and the TB size when the TTI is 2 ms.

| E – TFCI$_1$" | TB size (bits) |
|---|---|
| 0 | 18 |
| 1 | 120 |
| 2 | 124 |
| 3 | 129 |
| 4 | 133 |
| 5 | 138 |
| 6 | 143 |
| 7 | 149 |
| 8 | 154 |
| 9 | 160 |
| 10 | 166 |
| 11 | 172 |
| 12 | 178 |
| 13 | 185 |
| 14 | 192 |
| 15 | 199 |
| 16 | 206 |
| 17 | 214 |
| 18 | 222 |
| 19 | 230 |
| 20 | 238 |
| 21 | 247 |
| 22 | 256 |
| 23 | 266 |
| 24 | 275 |
| 25 | 286 |
| 26 | 296 |
| 27 | 307 |
| 28 | 318 |
| 29 | 330 |
| 30 | 342 |
| 31 | 355 |
| 32 | 368 |
| 33 | 382 |
| 34 | 396 |
| 35 | 410 |
| 36 | 426 |
| 37 | 441 |
| 38 | 458 |
| 39 | 474 |
| 40 | 492 |
| 41 | 510 |
| 42 | 529 |
| 43 | 548 |
| 44 | 569 |
| 45 | 590 |
| 46 | 611 |
| 47 | 634 |
| 48 | 657 |
| 49 | 682 |
| 50 | 707 |
| 51 | 733 |
| 52 | 760 |
| 53 | 788 |
| 54 | 817 |
| 55 | 847 |
| 56 | 878 |
| 57 | 911 |
| 58 | 944 |
| 59 | 979 |
| 60 | 1015 |
| 61 | 1053 |
| 62 | 1091 |
| 63 | 1132 |
| 64 | 1173 |
| 65 | 1217 |
| 66 | 1262 |
| 67 | 1308 |
| 68 | 1356 |
| 69 | 1406 |
| 70 | 1458 |
| 71 | 1512 |
| 72 | 1568 |
| 73 | 1626 |
| 74 | 1685 |
| 75 | 1748 |
| 76 | 1812 |
| 77 | 1879 |
| 78 | 1948 |
| 79 | 2020 |
| 80 | 2094 |
| 81 | 2172 |
| 82 | 2252 |
| 83 | 2335 |
| 84 | 2421 |
| 85 | 2510 |
| 86 | 2603 |
| 87 | 2699 |
| 88 | 2798 |
| 89 | 2901 |
| 90 | 3008 |
| 91 | 3119 |
| 92 | 3234 |
| 93 | 3353 |
| 94 | 3477 |
| 95 | 3605 |
| 96 | 3738 |
| 97 | 3876 |
| 98 | 4019 |
| 99 | 4167 |
| 100 | 4321 |
| 101 | 4480 |
| 102 | 4645 |
| 103 | 4816 |
| 104 | 4994 |
| 105 | 5178 |
| 106 | 5369 |
| 107 | 5567 |
| 108 | 5772 |
| 109 | 5985 |
| 110 | 6206 |
| 111 | 6435 |
| 112 | 6672 |
| 113 | 6918 |
| 114 | 7173 |
| 115 | 7437 |
| 116 | 7711 |
| 117 | 7996 |
| 118 | 8290 |
| 119 | 8596 |
| 120 | N/A |
| 121 | 9241 |
| 122 | 9582 |
| 123 | 9935 |
| 124 | 10302 |
| 125 | 10681 |
| 126 | 11075 |
| 127 | 11484 |

In the foregoing table, for example, when the E-TFCI"$_1$ acquired by the user equipment is 89, the TB size selected by the user equipment is 2901 bits. It should be noted that, when the TTI is set to a different time value, the correspondence table between the E-TFCI"$_1$ and the TB size is different. Moreover, a correspondence table of another type may also be set according to an actual application scenario. Table 1 listed herein is merely used to clearly describe an implementation process of step 105 and has no limitation on the embodiments of the present invention.

It should be noted that, the selection method may further include the following steps:

D1: The user equipment receives a dual-stream channel quality difference SD or an equivalent transmit power offset $A_{edm2}^2$ of a secondary stream in the dual-stream transmission mode that are sent by the base station.

The dual-stream channel quality difference (SD, Signal interference noise ratio Difference) represents a channel quality difference between the primary stream and the secondary stream. A symbol "$A_{edm2}{}^2$" is used to represent the equivalent transmit power offset of the secondary stream in the dual-stream transmission mode of the ULMIMO system.

D2: The user equipment calculates a transmit power offset $A''_{ed}{}^2$ of the secondary stream according to the E-TFCI"$_1$, the reference E-TFC set, the $A_{ed}{}^2$, and the primary-stream channel quality difference.

In this embodiment of the present invention, a symbol "$A''_{ed}{}^2$" is used to represent the transmit power offset of the secondary stream. Step D2 may specifically include the following:

D2a: The user equipment calculates the equivalent transmit power offset $A''_{edm1}{}^2$ of the primary stream according to the reference E-TFC set and the E-TFCI"$_1$.

D2b: The user equipment calculates the transmit power offset $A''_{ed}{}^2$ of the secondary stream according to the $A''_{edm1}{}^2$, the $A_{ed}{}^2$, and the primary-stream channel quality difference.

Figure 4:
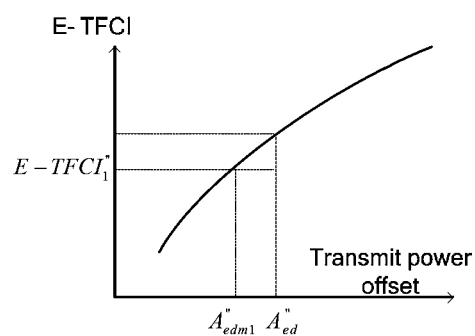

For step D2a, as shown in FIG. 4, with reference to the reference E-TFC set, the E-TFCI"$_1$ is a vertical coordinate of the curve of the reference E-TFC set. Then, by using this curve, a horizontal coordinate may be obtained and the $A''_{edm1}{}^2$ may be obtained according to this horizontal coordinate. The symbol "$A''_{edm1}{}^2$" is used herein to represent the equivalent transmit power offset of the primary stream. For details, reference may be made to a description part of step A2. For step D2b, the user equipment calculates the transmit power offset $A''_{ed}{}^2$ of the secondary stream by using the following formula (6):

$$A''^2_{ed} = \frac{A^2_{ed}A''^2_{edm1}}{A^2_{ed} - A''^2_{edm1}(\delta_1 - 1)} \quad (6)$$

Then, if, within the TTI, the transmit power offset $A''_{ed}{}^2$ of the secondary stream is equal to the first transmit power offset $A_{ed}{}^2$ of the primary stream granted by the base station, and the user equipment receives the equivalent transmit power offset $A_{edm2}{}^2$, which is in the dual-stream transmission mode of the ULMIMO system and is sent by the base station, of the secondary stream, step D3 is performed. If, within the TTI, the transmit power offset $A''_{ed}{}^2$ of the secondary stream is equal to the first transmit power offset $A_{ed}{}^2$ of the primary stream granted by the base station, and the user equipment receives the dual-stream channel quality difference SD sent by the base station, step D4 is performed. If, within the TTI, the transmit power offset $A''_{ed}{}^2$ of the secondary stream is not equal to the first transmit power offset $A_{ed}{}^2$ of the primary stream granted by the base station, and the user equipment receives the equivalent transmit power offset $A_{edm2}{}^2$, which is in the dual-stream transmission mode of the ULMIMO system and is sent by the base station, of the secondary stream, step D5 is performed. If, within the TTI, the transmit power offset $A''_{ed}{}^2$ of the secondary stream is not equal to the first transmit power offset $A_{ed}{}^2$ of the primary stream granted by the base station, and the user equipment receives the dual-stream channel quality difference SD sent by the base station, step D6 or step D7 is performed. Steps D3 to D7 are steps that need to be performed based on different trigger conditions. These five steps are in an OR relationship.

D3: The user equipment calculates, when inter-stream interference is considered and the transmit power offset of the secondary stream is $A_{ed}{}^2$, a first transport format combination indicator E-TFCI$_2$ of the secondary stream according to the $A_{edm2}{}^2$ and the reference E-TFC set.

D4: The user equipment calculates, when inter-stream interference is considered and the transmit power offset of the secondary stream is $A_{ed}{}^2$, a first transport format combination indicator E-TFCI$_2$ of the secondary stream according to the $A_{ed}{}^2$, the primary-stream channel quality difference, the SD, and the reference E-TFC set.

For step D4, the following steps may be specifically included:

D4a: The user equipment calculates the equivalent transmit power offset $A_{edm2}{}^2$ of the secondary stream according to the $A_{ed}{}^2$, the primary-stream channel quality difference, and the SD.

D4b: The user equipment calculates, when inter-stream interference is considered and the transmit power offset of the secondary stream is $A_{ed}{}^2$, the first transport format combination indicator E-TFCI$_2$ of the secondary stream according to the $A_{edm2}{}^2$ and the reference E-TFC set.

For step D4a, when the primary-stream channel quality difference is the primary-stream grant offset $\delta_1$ and the SD is a dual-stream channel quality ratio $\delta_2$, the $\delta_2$ is a linear value. If the dual-stream channel quality difference SD is a log value $\delta_{l2}$, the $\delta_{l2}$ is converted into the linear value $\delta_2$ according to the formula $$\delta_2 = 10^{\frac{\delta_{l2}}{10}};$$

or if the dual-stream channel quality difference SD is an offset in a serving grant SG quantization table, the offset is converted into the linear value $\delta_2$. Step D4a is specifically as follows: the user equipment calculates the equivalent transmit power offset $A_{edm2}{}^2$ of the secondary stream by using the following formula (7):

$$A^2_{edm2} = \frac{A^2_{ed}}{\delta_2 \times \delta_1} \quad (7)$$

where, a symbol "$\delta_2$" is used to represent the dual-stream channel quality ratio (SINR ratio).

For step D4a, when the primary-stream channel quality difference is the primary-stream grant offset $\delta_1$ and the SD is a dual-stream E-TFCI offset $\delta_{t2}$, that the user equipment calculates, when inter-stream interference is considered and the transmit power offset of the secondary stream is $A_{ed}{}^2$, a first transport format combination indicator E-TFCI$_2$ of the secondary stream according to the $A_{ed}{}^2$, the primary-stream channel quality difference, the SD, and the reference E-TFC set comprises:

D4c: The user equipment calculates, when inter-stream interference is considered and the transmit power offset of the primary stream is $A_{ed}{}^2$, the first transport format combination indicator E-TFCI$_1$ of the primary stream according to the grant offset $\delta_1$ of the primary stream and the $A_{ed}{}^2$.

D4d: The user equipment calculates, when inter-stream interference is considered and the transmit power offset of the secondary stream is $A_{ed}{}^2$, the first transport format combination indicator E-TFCI$_2$ of the secondary stream by using the following formula (8):

$$\text{E-TFCI}_2 = \text{E-TFCI}_1 - \delta_{t2} \quad (8)$$

D5: The user equipment calculates, when inter-stream interference is considered, the equivalent transmit power offset $A'_{edm2}{}^2$ of the secondary stream according to the $A_{edm2}{}^2$, the $A''_{ed}{}^2$, and the $A_{ed}{}^2$. The user equipment calculates, when inter-stream interference is considered and the transmit power offset of the secondary stream is $A''_{ed}{}^2$, a second transport format combination indicator E-TFCI'$_2$ of the secondary stream according to the $A'_{edm2}{}^2$ and the reference E-TFC set.

For step D5, that the user equipment calculates, when inter-stream interference is considered, the equivalent transmit power offset $A'_{edm2}{}^2$ of the secondary stream according to the $A_{edm2}{}^2$, the $A''_{ed}{}^2$, and the $A_{ed}{}^2$ is specifically as follows: the user equipment calculates, when inter-stream interference is considered, the equivalent transmit power offset $A'_{edm2}{}^2$ of the secondary stream by using the following formula (9):

$$A'^2_{edm2} = \frac{A''^2_{ed} A^2_{edm2}}{A^2_{ed}} \qquad (9)$$

For implementation of the manner (9), a specific deducing process on the user equipment side may be as follows:

When the transmit power offset of the primary stream and the secondary stream is not equal to the first transmit power offset $A_{ed}{}^2$ the primary stream granted by the base station, and when inter-stream interference is considered, the signal interference noise ratio of the secondary stream is defined as SINR'$_2$, which is represented by using a formula (9a) as follows:

$$SINR'_2 = \frac{A''^2_{ed} P_c |g_{22}|^2}{\sigma_2^2 + A''^2_{ed} P_c |g_{21}|^2} \qquad (9a)$$

where:

additionally, the SINR'$_2$ may also be represented by using a formula (9b) as follows:

$$SINR'_2 = \frac{A'^2_{edm2} P_c |g_{11}|^2}{\sigma_1^2} = A'^2_{edm2} \times SINR_c \qquad (9b)$$

A formula (9c) may be obtained by using the formulas (9a) and (9b) as follows:

$$A'^2_{edm2} = \frac{A''^2_{ed} |g_{22}|^2 \sigma_1^2}{(\sigma_2^2 + A''^2_{ed} P_c |g_{21}|^2)|g_{11}|^2} \qquad (9c)$$

A symbol "SINR$_2$" is used to represent the signal interference noise ratio that is of the secondary stream and is in the dual-stream transmission mode of the ULMIMO system when inter-stream interference is considered. The SINR$_2$ is represented by using a formula (9d) as follows:

$$SINR_2 = \frac{A^2_{ed} P_c |g_{22}|^2}{\sigma_2^2 + A^2_{ed} P_c |g_{21}|^2} \qquad (9d)$$

Additionally, the SINR$_2$ is represented by using a formula (9e) as follows:

$$SINR_2 = \frac{A^2_{edm2} P_c |g_{11}|^2}{\sigma_1^2} = A^2_{edm2} \times SINR_c \qquad (9e)$$

A formula (9f) may be obtained by using the formulas (9d) and (9e) as follows:

$$A^2_{edm2} = \frac{A^2_{ed} |g_{22}|^2 \sigma_1^2}{(\sigma_2^2 + A^2_{ed} P_c |g_{21}|^2)|g_{11}|^2} \qquad (9f)$$

A formula (9g) may be obtained by using the formulas (9c) and (9f) as follows:

$$A'^2_{edm2} = \frac{A''^2_{ed} A^2_{edm2}(\sigma_2^2 + A^2_{ed} P_c |g_{21}|^2)}{A^2_{ed}(\sigma_2^2 + A''^2_{ed} P_c |g_{21}|^2)} \qquad (9g)$$

Generally, $A''_{ed}{}^2 \leq A_{ed}{}^2$; therefore, $$A'^2_{edm2} \geq \frac{A''^2_{ed} A^2_{edm2}}{A^2_{ed}}.$$

Therefore, the equivalent transmit power offset $A'_{edm2}{}^2$ of the secondary stream may be estimated first by using the equivalent transmit power offset $A_{edm2}{}^2$ that is of the secondary stream and is under transmit power granted by the base station, and by using the following formula (9):

$$A'^2_{edm2} \geq \frac{A''^2_{ed} A^2_{edm2}}{A^2_{ed}} \qquad (9)$$

D6: The user equipment calculates the equivalent transmit power offset $A''_{edm1}{}^2$ of the primary stream according to the E-TFCI''$_1$ and the reference E-TFC set. The user equipment calculates, when inter-stream interference is considered, the equivalent transmit power offset $A'_{edm2}{}^2$ of the secondary stream according to the SD and the $A''_{edm1}{}^2$. The user equipment calculates, when inter-stream interference is considered and the transmit power offset of the secondary stream is $A''_{ed}{}^2$, a second transport format combination indicator E-TFCI'$_2$ of the secondary stream according to the $A'_{edm2}{}^2$ and the reference E-TFC set.

When the SD is the dual-stream channel quality ratio $\delta_2$, the $\delta_2$ is a linear value. If the dual-stream channel quality difference SD that is sent by the base station and received by the user equipment is a log value $\delta_{l2}$, the $\delta_{l2}$ is converted into the linear value $\delta_2$ according to the formula $$\delta_2 = 10^{\frac{\delta_{l2}}{10}}.$$

That the user equipment calculates, when inter-stream interference is considered, the equivalent transmit power offset $A'_{edm2}{}^2$ of the secondary stream according to the SD and the $A''_{edm1}{}^2$ is specifically as follows: the user equipment calculates, when inter-stream interference is considered, the equivalent transmit power offset $A'_{edm2}{}^2$ of the secondary stream by using the following formula (10):

$$A'^2_{edm2} = \frac{A''^2_{edm1}}{\delta_2} \qquad (10)$$

D7: The user equipment calculates the equivalent transmit power offset $A_{edm2}^2$ of the secondary stream according to the $A_{ed}^2$, the primary-stream channel quality difference, and the SD. The user equipment calculates, when inter-stream interference is considered, the equivalent transmit power offset $A'_{edm2}^2$ of the secondary stream according to the $A_{edm2}^2$, the $A''_{ed}^2$, and the $A_{ed}^2$. The user equipment calculates, when inter-stream interference is considered and the transmit power offset of the secondary stream is $A''_{ed}^2$, a second transport format combination indicator E-TFCI'$_2$ of the secondary stream according to the $A'_{edm2}^2$ and the reference E-TFC set.

For step D7, when the primary-stream channel quality difference is the primary-stream grant offset $\delta_1$ and the SD is a dual-stream E-TFCI offset $\delta_{t2}$, that the user equipment calculates the equivalent transmit power offset $A_{edm2}^2$ of the secondary stream according to the $A_{ed}^2$, the primary-stream channel quality difference, and the SD includes:

D7a: The user equipment calculates, when inter-stream interference is considered and the transmit power offset of the primary stream is $A_{ed}^2$, the equivalent transmit power offset $A_{edm1}^2$ of the primary stream by using the following formula (11):

$$A_{edm1}^2 = \frac{A_{ed}^2}{\delta_1} \qquad (11)$$

D7b: The user equipment calculates, when inter-stream interference is considered and the transmit power offset of the primary stream is $A_{ed}^2$, the first transport format combination indicator E-TFCI$_1$ of the primary stream according to the $A_{edm1}^2$ and the reference E-TFC set.

D7c: The user equipment calculates, when inter-stream interference is considered and the transmit power offset of the secondary stream is $A_{ed}^2$, a first transport format combination indicator E-TFCI$_2$ of the secondary stream by using the following formula (12):

$$\text{E-TFCI}_2 = \text{E-TFCI}_1 - \delta_{t2} \qquad (12)$$

D7d: The user equipment calculates the equivalent transmit power offset $A_{ed}^2$ of the secondary stream according to the E-TFCI$_2$ and the reference E-TFC set.

It can be learned from the foregoing embodiments that, a user equipment receives a reference E-TFC set sent by a base station and a channel quality difference, which is in a dual-stream transmission mode of an ULMIMO system and is sent by the base station, of a primary stream. Then the user equipment acquires, according to a primary-stream serving grant allocated to the user equipment by the base station within a transmission time interval TTI, a first transmit power offset $A_{ed}^2$ of the primary stream granted by the base station. Finally, the user equipment calculates, when inter-stream interference is considered, an E-TFCI$_1$ or an E-TFCI'$_1$ separately according to a difference, that is, whether transmit power of the primary stream is based on primary-stream transmit power granted by the base station or is based on remaining transmit power. Finally, based on the E-TFCI$_1$ and the E-TFCI'$_1$, the user equipment selects an indicator, which has a smaller value, as an E-TFCI''$_1$, and the user equipment selects a transmission block size that corresponds to the E-TFCI''$_1$. This transmission block size can be applied to the dual-stream transmission mode of the ULMIMO system.

Figure 5:
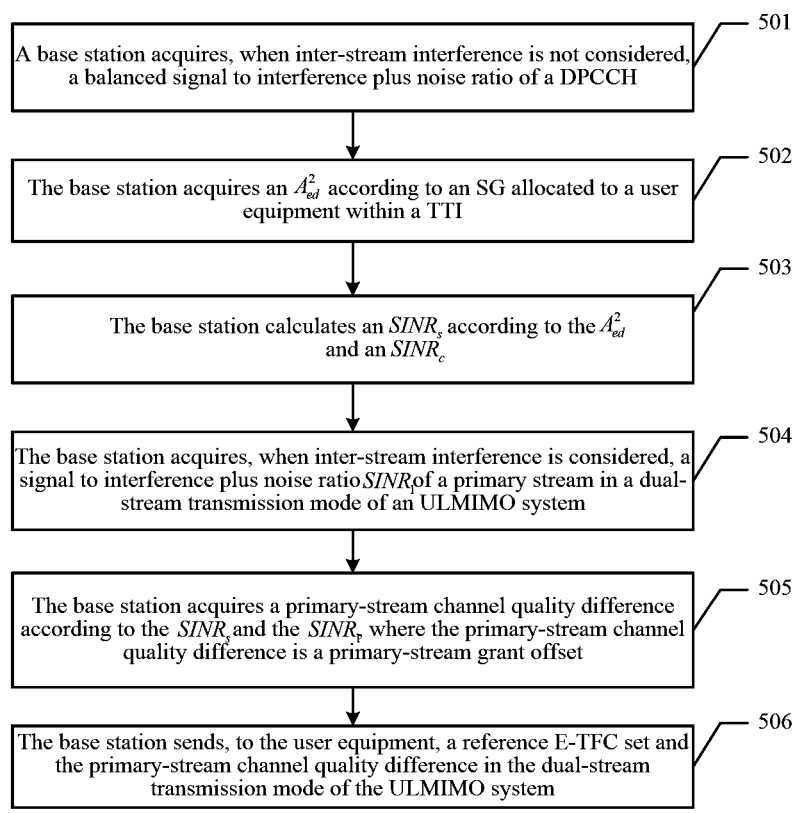
FIG. 5 is a schematic diagram of a method for sending a primary-stream channel quality difference according to an embodiment of the present invention.

The foregoing embodiments describe an E-TFCI''$_1$ selection method that is implemented on a user equipment side. The following describes a method for sending a primary-stream channel quality difference, which is implemented based on a base station side. Referring to FIG. 5, the method for sending a primary-stream channel quality difference includes:

501: A base station acquires, when inter-stream interference is not considered, a balanced signal interference noise ratio SINR$_c$ of a dedicated physical control channel (DPCCH, Dedicated Physical Control Channel)

In this embodiment of the present invention, a symbol "SINR$_c$" is used to represent the balanced signal interference noise ratio of a DPCCH when inter-stream interference is not considered.

In an actual application, the base station may acquire the SINR$_c$ by using the following formula (13):

$$SINR_c = \frac{P_c|g_{11}|^2}{\sigma_1^2} \qquad (13)$$

where, a symbol "$g_{11}$" is used to represent a channel between a port through which a user equipment sends a primary stream and a port through which the base station receives a primary stream; a symbol "$\sigma_1^2$" is used to represent balanced equivalent noise power, which is of a primary pilot and is of a DPCCH, within a transmission time interval, where the balanced equivalent noise power is estimated by the base station; and a symbol "$P_c$" is used to represent transmit power, which is of a primary pilot and is of a DPCCH, within a transmission time interval.

It should be noted that, uplink inner loop power control enables the SINR$_c$ to converge to a value near a target signal to noise ratio. Transmit power of a data channel uses power of a DPCCH channel as a reference, which has a fixed power offset relative to the DPCCH channel, and enables a signal interference noise ratio of the data channel to be relatively stable.

502: The base station acquires, according to a primary-stream serving grant SG allocated to a user equipment within a transmission time interval TTI, a first transmit power offset $A_{ed}^2$ of the primary stream granted by the base station.

A symbol "$A_{ed}^2$" is used to represent the first transmit power offset of the primary stream granted by the base station. The base station generally allocates the serving grant of the primary stream or a sum of serving grants of dual streams to the user equipment. If the base station allocates the sum of the serving grants of the dual streams to the user equipment, the base station may convert the sum into the serving grant of the primary stream. Within a TTI, the base station may acquire, according to the SG, the first transmit power offset $A_{ed}^2$ of the primary stream granted by the base station.

503: The base station calculates, according to the $A_{ed}^2$ and the SINR$_c$ when inter-stream interference is not considered, a signal interference noise ratio SINR$_s$ of the primary stream in a dual-stream transmission mode of an ULMIMO system.

In this embodiment of the present invention, a symbol "SINR$_s$" is used to represent the signal interference noise ratio of the primary stream in the dual-stream transmission mode of the ULMIMO system, when inter-stream interference is not considered. The base station may calculate the SINR$_s$ according to the parameters $A_{ed}^2$ and SINR$_c$ that are obtained in the foregoing steps.

Specifically, the base station may calculate the $SINR_s$ by using the following formula (14):

$$SINR_s = \frac{A_{ed}^2 P_c |g_{11}|^2}{\sigma_1^2} = A_{ed}^2 \times SINR_c \qquad (14)$$

504: The base station acquires, when inter-stream interference is considered, a signal interference noise ratio $SINR_1$ of the primary stream in the dual-stream transmission mode of the ULMIMO system.

In this embodiment of the present invention, the base station acquires, when inter-stream interference is considered, the signal interference noise ratio $SINR_1$ of the primary stream in the dual-stream transmission mode of the ULMIMO system. Specifically, when inter-stream interference is considered, it is assumed that transmit power of a secondary stream is equal to transmit power of the primary stream, then the signal interference noise ratio $SINR_1$ of the primary stream may be obtained by using the following formula (15):

$$SINR_1 = \frac{A_{ed}^2 P_c |g_{11}|^2}{\sigma_1^2 + A_{ed}^2 P_c |g_{12}|^2} \qquad (15)$$

where, a symbol "$g_{12}$" is used to represent a channel between a port through which the user equipment sends a secondary stream and a port through which the base station receives a primary stream.

505: The base station acquires the primary-stream channel quality difference according to the $SINR_s$ and the $SINR_1$, where the primary-stream channel quality difference is a primary-stream grant offset $\delta_1$.

In this embodiment of the present invention, impact of inter-stream interference is embodied as the primary-stream channel quality difference, that is, a decrease of the signal interference noise ratio $SINR_1$ relative to the $SINR_s$. Therefore, the primary-stream grant offset may be used to represent the primary-stream channel quality difference. If the $\delta_1$ is used to represent a linear value of the grant offset of the primary stream, the primary-stream channel quality difference in step 505 is specifically the primary-stream grant offset $\delta_1$. Specifically, that the base station acquires the primary-stream channel quality difference according to the $SINR_s$ and the $SINR_1$ is specifically as follows: the base station acquires the primary-stream grant offset $\delta_1$ by using the following formula (16):

$$\delta_1 = \frac{SINR_s}{SINR_1} \qquad (16)$$

506: The base station sends, to the user equipment, a reference E-TFC set and the channel quality difference that is of the primary stream and is in the dual-stream transmission mode of the uplink multiple-input multiple-output ULMIMO system.

In this embodiment of the present invention, after the base station acquires the primary-stream channel quality difference, the base station sends, to the user equipment, the reference E-TFC set and the primary-stream channel quality difference in the dual-stream transmission mode of the uplink multiple-input multiple-output ULMIMO system. In this embodiment of the present invention, instead of sending two reference E-TFC sets as that in the prior art, the base station only needs to send one reference E-TFC set.

It should be noted that, after the base station acquires the primary-stream channel quality difference according to the $SINR_s$ and the $SINR_1$ in step 505, the method further includes the following steps:

E1: The base station acquires, when inter-stream interference is considered, a signal interference noise ratio $SINR_2$ that is in the dual-stream transmission mode of the ULMIMO system and is of a secondary stream.

E2: The base station acquires a dual-stream channel quality difference SD according to the $SINR_2$ and the $SINR_1$, where the SD is a dual-stream channel quality ratio $\delta_2$.

E3: The base station sends the SD to the user equipment.

For step E1, a symbol "$SINR_2$" is used to represent the signal interference noise ratio, which is in the dual-stream transmission mode of the ULMIMO system and is of the secondary stream, when inter-stream interference is considered. Specifically, the base station may calculate the $SINR_2$ by using the following formula (17):

$$SINR_2 = \frac{A_{ed}^2 P_c |g_{22}|^2}{\sigma_2^2 + A_{ed}^2 P_c |g_{21}|^2} \qquad (17)$$

In (17), it is assumed that the transmit power of the secondary stream is equal to the transmit power of the primary stream, that is, a transmit power offset of the secondary stream is equal to a transmit power offset $A''_{ed}{}^2$ of the primary stream within the TTI, then the transmit power offset $A''_{ed}{}^2$ of the primary stream and the secondary stream is equal to the first transmit power offset $A_{ed}{}^2$ of the primary stream granted by the base station. A symbol "$\sigma_2^2$" is used to represent balanced equivalent noise power of the secondary stream; a symbol "$g_{21}$" is used to represent an interference channel between a port through which the user equipment sends a primary stream and a port through which the base station receives a secondary stream; a symbol "$g_{22}$" is used to represent a channel between a port through which the user equipment sends a secondary stream and a port through which the base station receives a secondary stream.

For step E2, that the base station acquires a dual-stream channel quality difference SD according to the $SINR_2$ and the $SINR_1$ is specifically as follows: the base station acquires the $\delta_2$ by using the following formula (18):

$$\delta_2 = \frac{SINR_1}{SINR_2} \qquad (18)$$

In addition, the SD sent by the base station to the user equipment in step E3 may be sent concurrently with data that is sent in step 506, which is not limited herein.

In this embodiment of the present invention, a base station separately acquires an $SINR_s$ and an $SINR_1$ and then sends, to a user equipment, a reference E-TFC set and a channel quality difference that is in a dual-stream transmission mode of an ULMIMO system and is of a primary stream. Because inter-stream interference is considered when the $SINR_s$ and the $SINR_1$ are separately acquired, the user equipment can implement transmission of uplink data after receiving the primary-stream channel quality difference. Transmission of uplink data can be applied to the dual-stream transmission mode of the ULMIMO system.

Figure 6:
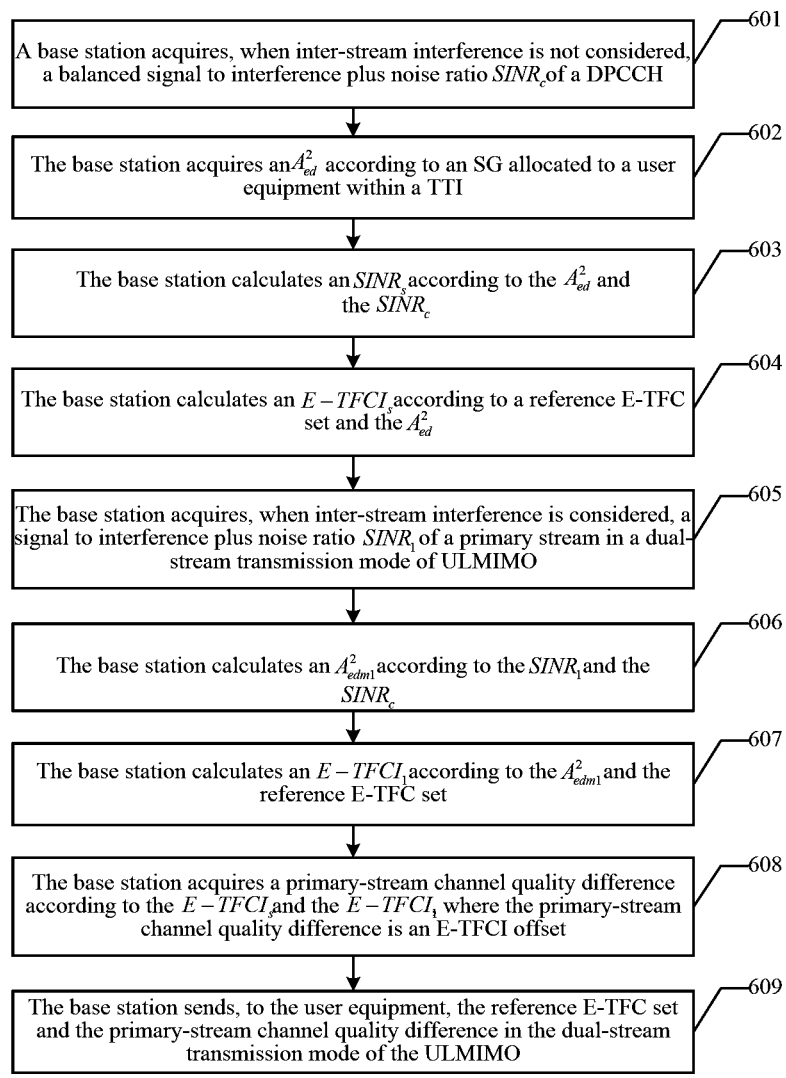
FIG. 6 is a schematic diagram of another method for sending a primary-stream channel quality difference according to an embodiment of the present invention.

The foregoing embodiment describes a method for sending a primary-stream channel quality difference, which is implemented based on a base station side. The following describes another method for sending a primary-stream channel quality difference, which is implemented based on the base station side. Referring to FIG. 6, the method includes:

601: A base station acquires, when inter-stream interference is not considered, a balanced signal interference noise ratio $SINR_c$ of a dedicated physical control channel DPCCH.

In this embodiment of the present invention, a symbol "$SINR_c$" is used to represent the balanced signal interference noise ratio of a DPCCH when inter-stream interference is not considered.

In an actual application, the base station may acquire the $SINR_c$ by using the foregoing manner (13):

$$SINR_c = \frac{P_c|g_{11}|^2}{\sigma_1^2} \quad (13)$$

602: The base station acquires, according to a primary-stream serving grant SG allocated to a user equipment within a transmission time interval TTI, a first transmit power offset $A_{ed}^2$ of the primary stream granted by the base station.

A symbol "$A_{ed}^2$" is used to represent the first transmit power offset of the primary stream granted by the base station. The base station generally allocates the serving grant of the primary stream or a sum of serving grants of dual streams to the user equipment. If the base station allocates the sum of the serving grants of the dual streams to the user equipment, the base station may convert the sum into the serving grant of the primary stream. Within a TTI, the base station may acquire, according to the SG, the first transmit power offset $A_{ed}^2$ of the primary stream granted by the base station.

603: The base station calculates, according to the $A_{ed}^2$ and the $SINR_c$ when inter-stream interference is not considered, a signal interference noise ratio $SINR_s$ of the primary stream in a dual-stream transmission mode of an ULMIMO system.

In this embodiment of the present invention, a symbol "$SINR_s$" is used to represent the signal interference noise ratio of the primary stream in the dual-stream transmission mode of the ULMIMO system, when inter-stream interference is not considered. The base station may calculate the $SINR_s$ according to the parameters $A_{ed}^2$ and $SINR_c$ that are obtained in the foregoing steps.

Specifically, the base station may calculate the $SINR_s$ by using the following formula (14):

$$SINR_s = \frac{A_{ed}^2 P_c|g_{11}|^2}{\sigma_1^2} = A_{ed}^2 \times SINR_c \quad (14)$$

604: The base station calculates, according to a reference E-TFC set and the $A_{ed}^2$, a fourth transport format combination indicator E-TFCI$_s$ that is of the primary stream and corresponds to the $SINR_s$.

For step 604, a symbol "E-TFCI$_s$" is used to represent the fourth transport format combination indicator of the primary stream when inter-stream interference is not considered. As shown in FIG. 3, with reference to the reference E-TFC set, $A_{ed}^2$ is a horizontal coordinate of the curve of the reference E-TFC set. Then, by using this curve, a vertical coordinate may be obtained and this vertical coordinate is the E-TFCI$_s$. For details, reference may be made to a description part of step A2.

605: The base station acquires, when inter-stream interference is considered, a signal interference noise ratio $SINR_1$ of the primary stream in the dual-stream transmission mode of the ULMIMO system.

In this embodiment of the present invention, the base station acquires, when inter-stream interference is considered, the signal interference noise ratio $SINR_1$ of the primary stream in the dual-stream transmission mode of the ULMIMO system. Specifically, when inter-stream interference is considered, it is assumed that transmit power of a secondary stream is equal to transmit power of the primary stream, then the signal interference noise ratio $SINR_1$ of the primary stream may be obtained by using the foregoing manner (15):

$$SINR_1 = \frac{A_{ed}^2 P_c|g_{11}|^2}{\sigma_1^2 + A_{ed}^2 P_c|g_{12}|^2} \quad (15)$$

606: The base station calculates, when inter-stream interference is considered and a transmit power offset of the primary stream is $A_{ed}^2$, an equivalent transmit power offset $A_{edm1}^2$ of the primary stream according to the $SINR_1$ and the $SINR_c$.

A symbol "$A_{edm1}^2$" is used to represent the equivalent transmit power offset of the primary stream when inter-stream interference is considered and the transmit power offset of the primary stream is $A_{ed}^2$. Specifically, the base station may calculate the $A_{edm1}^2$ by using the following formula (19):

$$A_{edm1}^2 = \frac{SINR_1}{SINR_c} \quad (19)$$

607: The base station calculates, according to the $A_{edm1}^2$ and the reference E-TFC set, a first transport format combination indicator E-TFCI$_1$ that is of the primary stream and corresponds to the $SINR_1$.

For step 607, as shown in FIG. 3, with reference to the reference E-TFC set, the $A_{edm1}^2$ is obtained by using step 606. That is, a horizontal coordinate of the curve of the reference E-TFC set is obtained. Then, by using this curve, a vertical coordinate may be obtained and this vertical coordinate is the E-TFCI$_1$. For details, reference may be made to a description part of step A2.

608: The base station acquires the primary-stream channel quality difference according to the E-TFCI$_s$ and the E-TFCI$_1$, where the primary-stream channel quality difference is a primary-stream E-TFCI offset $\delta_{t1}$.

In this embodiment of the present invention, impact of inter-stream interference is embodied as the primary-stream channel quality difference, that is, a decrease of the signal interference noise ratio $SINR_1$ relative to the $SINR_s$. Therefore, the primary-stream E-TFCI offset may be used to represent the primary-stream channel quality difference. The impact of inter-stream interference is further embodied as a decrease of a transmission block size, that is, a decrease to the E-TFCI$_1$ relative to the E-TFCI$_s$. If the primary-stream E-TFCI offset $\delta_{t1}$ is used to represent the primary-stream grant offset. That the base station acquires the primary-stream channel quality difference according to the E-TFCI$_s$ and the E-TFCI$_1$ is specifically as follows: the base station acquires the primary-stream E-TFCI offset $\delta_{t1}$ by using the following formula (20):

$$\delta_{t1} = \text{E-TFCI}_s - \text{E-TFCI}_1 \quad (20)$$

609: The base station sends, to the user equipment, the reference E-TFC set and the channel quality difference that is of the primary stream and is in the dual-stream transmission mode of the uplink multiple-input multiple-output ULMIMO system.

In this embodiment of the present invention, after the base station acquires the primary-stream channel quality difference, the base station sends, to the user equipment, the reference E-TFC set and the primary-stream channel quality difference in the dual-stream transmission mode of the uplink multiple-input multiple-output ULMIMO system. In this embodiment of the present invention, instead of sending two reference E-TFC sets as that in the prior art, the base station only needs to send one reference E-TFC set.

It should be noted that, the base station may specifically send, to the user equipment, by using a physical layer, the primary-stream channel quality difference in the dual-stream transmission mode of the ULMIMO system.

It should be noted that, after the base station acquires the primary-stream channel quality difference according to the E-TFCI$_s$ and the E-TFCI$_1$ in step 608, the method may further include the following steps:

F1: If, within the TTI, a transmit power offset of a secondary stream is equal to the first transmit power offset $A_{ed}^2$ of the primary stream granted to the user equipment, the base station acquires, when inter-stream interference is considered and the transmit power offset of the secondary stream is $A_{ed}^2$, a signal interference noise ratio SINR$_2$ of the secondary stream.

F2: The base station calculates, when inter-stream interference is considered and the transmit power offset of the secondary stream is $A_{ed}^2$, an equivalent transmit power offset $A_{edm2}^2$ of the secondary stream according to the SINR$_2$ and the SINR$_c$.

F3: The base station sends, to the user equipment, the equivalent transmit power offset $A_{edm2}^2$ that is of the secondary stream and is in the dual-stream transmission mode of the ULMIMO system.

For step F1, specifically, a symbol "SINR$_2$" is used to represent the signal interference noise ratio, which is in the dual-stream transmission mode of the ULMIMO system and is of the secondary stream, when inter-stream interference is considered. Specifically, the base station may calculate the SINR$_2$ by using the foregoing manner (17):

$$SINR_2 = \frac{A_{ed}^2 P_c |g_{22}|^2}{\sigma_2^2 + A_{ed}^2 P_c |g_{21}|^2} \tag{17}$$

For step F2, the base station calculates, when inter-stream interference is considered and the transmit power offset of the secondary stream is $A_{ed}^2$, the equivalent transmit power offset $A_{edm2}^2$ of the secondary stream by using the following formula (21):

$$A_{edm2}^2 = \frac{SINR_2}{SINR_c} \cdot A_{ed}^2 \tag{21}$$

It should be noted that, after step F2 is performed, the method may further include the following steps:

G1: The base station calculates, according to the $A_{edm2}^2$ and the reference E-TFC set, a first transport format combination indicator E-TFCI$_2$ that is of the secondary stream and corresponds to the SINR$_1$.

G2: The base station acquires a dual-stream channel quality difference according to the E-TFCI$_2$ and the E-TFCI$_1$, where the dual-stream channel quality difference is a dual-stream E-TFCI offset $\delta_{t2}$.

G3: The base station sends the dual-stream channel quality difference to the user equipment.

For step G2, that the base station acquires a dual-stream channel quality difference according to the E-TFCI$_2$ and the E-TFCI$_1$ is specifically as follows: the base station acquires the dual-stream E-TFCI offset $\delta_{t2}$ of the primary stream by using the following formula (22):

$$\delta_{t2} = \text{E-TFCI}_1 - \text{E-TFCI}_2 \tag{22}$$

In this embodiment of the present invention, a base station separately acquires an E-TFCI$_s$ and an E-TFCI$_1$, and then sends, to a user equipment, a reference E-TFC set and a channel quality difference that is in a dual-stream transmission mode of an ULMIMO system and is of a primary stream. Because inter-stream interference is considered when the E-TFCI$_s$ and the E-TFCI$_1$ are separately acquired, the user equipment can implement transmission of uplink data after receiving the primary-stream channel quality difference. Transmission of uplink data can be applied to the dual-stream transmission mode of the ULMIMO system.

The following embodiments describe an E-TFC selection method and a method for sending a primary-stream channel quality difference. The following describes apparatuses and devices corresponding to these methods. For a specific execution method of each unit, reference may be made to the foregoing method embodiments and only content of a related unit is described herein. Specific description is as follows.

Figure 7:
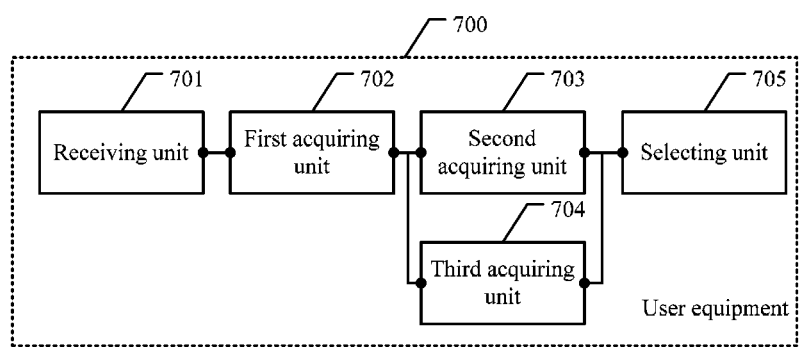
FIG. 7 is a schematic structural diagram of a user equipment according to an embodiment of the present invention.

As shown in FIG. 7, a user equipment 700 is used for transmission of uplink data in an uplink multiple-input multiple-output ULMIMO system. The user equipment 700 includes:

a receiving unit 701, configured to receive a reference E-TFC set sent by a base station and a channel quality difference, which is in a dual-stream transmission mode of the ULMIMO system and is sent by the base station, of a primary stream;

a first acquiring unit 702, configured to acquire, according to a primary-stream serving grant SG allocated to the user equipment by the base station within a transmission time interval TTI, a first transmit power offset $A_{ed}^2$ of the primary stream granted by the base station;

a second acquiring unit 703, configured to, when transmit power of the primary stream is obtained according to primary-stream transmit power granted by the base station, acquire, when inter-stream interference is considered and a transmit power offset of the primary stream is $A_{ed}^2$, a first transport format combination indicator E-TFCI$_1$ of the primary stream according to the primary-stream channel quality difference and the $A_{ed}^2$;

a third acquiring unit 704, configured to, when the transmit power of the primary stream is obtained according to remaining transmit power, which is calculated according to a limit value of maximum transmit power of the user equipment, calculate a second transmit power offset $A'_{ed}^2$ of the primary stream according to the remaining transmit power; calculate, when inter-stream interference is considered and the transmit power offset of the primary stream is $A'_{ed}^2$, an equivalent transmit power offset $A'_{ed}^2$ of the primary stream according to the primary-stream channel quality difference, the $A_{ed}^2$, and the $A'_{ed}^2$; and calculate, when inter-stream interference is considered and the transmit power offset of the primary stream is $A'_{ed}^2$, a second transport format combination indicator E-TFCI'$_1$; of the primary stream according to the reference E-TFC set and the A'$_{edm1}^2$; and a selecting unit 705, configured to, after the E-TFCI$_1$ and the E-TFCI'$_1$ are acquired, select from the E-TFCI$_1$ and the E-TFCI'$_1$ an indicator, which has a smaller value, as a third transport format combination indicator E-TFCI''$_1$ of the primary stream corresponding to a transport format used by the user equipment to send uplink data, so as to select a transmission block size corresponding to the E-TFCI''$_1$.

It should be noted that, when the primary-stream channel quality difference is a primary-stream grant offset $\delta_1$, the second acquiring unit 703 includes (not shown in FIG. 7):

a first calculating module, configured to calculate, when inter-stream interference is considered and the transmit power offset of the primary stream is A$_{ed}^2$, an equivalent transmit power offset A$_{edm1}^2$ of the primary stream by using the following formula:

$$A_{edm1}^2 = \frac{A_{ed}^2}{\delta_1};$$

and a first acquiring module, configured to acquire, when inter-stream interference is considered and the transmit power offset of the primary stream is A$_{ed}^2$, the first transport format combination indicator E-TFCI$_1$ of the primary stream according to the reference E-TFC set and the A$_{edm1}^2$.

It should be noted that, when the primary-stream channel quality difference is a primary-stream E-TFCI offset $\delta_{t1}$, the second acquiring unit 703 includes (not shown in FIG. 7):

a second calculating module, configured to calculate, when inter-stream interference is not considered, a fourth transport format combination indicator E-TFCI$_s$ of the primary stream according to the reference E-TFC set and the A$_{ed}^2$; and a third calculating module, configured to calculate, when inter-stream interference is considered and the transmit power offset of the primary stream is A$_{ed}^2$, the first transport format combination indicator E-TFCI$_1$ of the primary stream by using the following formula:

E-TFCI$_1$=E-TFCI$_s$–$\delta_{t1}$.

It should be noted that, when the primary-stream channel quality difference is the primary-stream grant offset $\delta_1$, the $\delta_1$ is a linear value. If the grant offset of the primary stream is a log value $\delta_{l1}$, the log value $\delta_{l1}$ is converted into the linear value $\delta_1$ according to a formula $$\delta_1 = 10^{\frac{\varepsilon_{l1}}{10}}.$$

The third acquiring unit 704 is specifically configured to calculate, when inter-stream interference is considered and the transmit power offset of the primary stream is A'$_{ed}^2$, the equivalent transmit power offset A'$_{edm1}^2$ of the primary stream by using the following formula:

$$A'^2_{edm1} = \frac{A_{ed}^2 A'^2_{ed}}{A_{ed}^2 + A'^2_{ed}(\delta_1 - 1)}.$$

It should be noted that, when the primary-stream channel quality difference is the primary-stream E-TFCI offset $\delta_{t1}$, the third acquiring unit 704 includes (not shown in FIG. 7):

a third calculating module, configured to calculate, when inter-stream interference is not considered, the fourth transport format combination indicator E-TFCI$_s$ of the primary stream according to the reference E-TFC set and the A$_{ed}^2$;

a fourth calculating module, configured to calculate, when inter-stream interference is considered and the transmit power offset of the primary stream is A$_{ed}^2$, the first transport format combination indicator E-TFCI$_1$ of the primary stream by using the following formula:

E-TFCI$_1$=E-TFCI$_s$–$\delta_{t1}$;

a fifth calculating module, configured to calculate, when inter-stream interference is considered and the transmit power offset of the primary stream is A$_{ed}^2$, the equivalent transmit power offset A$_{edm1}^2$ of the primary stream according to the reference E-TFC set and the E-TFCI$_1$.

a sixth calculating module, configured to calculate, the grant offset $\delta_1$ of the primary stream by using the following formula:

$$\delta_1 = \frac{A_{ed}^2}{A_{edm1}^2};$$

and a seventh calculating module, configured to calculate, when inter-stream interference is considered and the transmit power offset of the primary stream is A'$_{ed}^2$, the equivalent transmit power offset A'$_{edm1}^2$ of the primary stream by using the following formula:

$$A'^2_{edm1} = \frac{A_{ed}^2 A'^2_{ed}}{A_{ed}^2 + A'^2_{ed}(\delta_1 - 1)}.$$

It should be noted that, when the user equipment needs to transmit non-scheduling data, the second acquiring unit is specifically configured to:

acquire, when inter-stream interference is considered and the transmit power offset of the primary stream is A$_{ed}^2$, a scheduling data block size of the primary stream according to the primary-stream channel quality difference and the A$_{ed}^2$, and obtain the first transport format combination indicator E-TFCI$_1$ of the primary stream according to a sum of the scheduling data block size and a data block size of non-scheduling data.

Further, for the receiving unit 701, the receiving unit 701 is further configured to receive a dual-stream channel quality difference SD sent by the base station or an equivalent transmit power offset A$_{edm2}^2$, which is in the dual-stream transmission mode of the UL MIMO system and is sent by the base station, of a secondary stream.

The user equipment further includes the following units (not shown in FIG. 7):

a second calculating unit, configured to calculate a transmit power offset A''$_{ed}^2$ of the secondary stream according to the E-TFCI''$_1$, the reference E-TFC set, and the primary-stream channel quality difference;

a third calculating unit, configured to, when, within the TTI, the transmit power offset A''$_{ed}^2$ of the secondary stream is equal to the first transmit power offset A$_{ed}^2$ of the primary stream granted by the base station, and the user equipment receives the equivalent transmit power offset A$_{edm2}^2$, which is in the dual-stream transmission mode of the UL MIMO system and is sent by the base station, of the secondary stream, calculate, when inter-stream interference is considered and the transmit power offset of the secondary stream is $A_{ed}^2$, a first transport format combination indicator E-TFCI$_2$ of the secondary stream according to the $A_{edm2}^2$ and the reference E-TFC set; or a fourth calculating unit, configured to, when, within the TTI, the transmit power offset $A''_{ed}^2$ of the secondary stream is equal to the first transmit power offset $A_{ed}^2$ of the primary stream granted by the base station, and the user equipment receives the dual-stream channel quality difference SD sent by the base station, calculate, when inter-stream interference is considered and the transmit power offset of the secondary stream is $A_{ed}^2$, a first transport format combination indicator E-TFCI$_2$ of the secondary stream according to the $A_{ed}^2$, the primary-stream channel quality difference, the SD, and the reference E-TFC set; or a fifth calculating unit, configured to, when, within the TTI, the transmit power offset $A''_{ed}^2$ of the secondary stream is not equal to the first transmit power offset $A_{ed}^2$ of the primary stream granted by the base station, and the user equipment receives the equivalent transmit power offset $A_{edm2}^2$, which is in the dual-stream transmission mode of the ULMIMO system and is sent by the base station, of the secondary stream, calculate, when inter-stream interference is considered, an equivalent transmit power offset $A'_{edm2}^2$ of the secondary stream according to the $A_{edm2}^2$, the $A''_{ed}^2$, and the $A_{ed}^2$; and calculate, when inter-stream interference is considered and the transmit power offset of the secondary stream is $A''_{ed}^2$, a second transport format combination indicator E-TFCI'$_2$ of the secondary stream according to the $A'_{edm2}^2$ and the reference E-TFC set; or a sixth calculating unit, configured to, when, within the TTI, the transmit power offset $A''_{ed}^2$ of the secondary stream is not equal to the first transmit power offset $A_{ed}^2$ of the primary stream granted by the base station, and the user equipment receives the dual-stream channel quality difference SD that is in the dual-stream transmission mode of the ULMIMO system and is sent by the base station, calculate the equivalent transmit power offset $A''_{edm1}^2$ of the primary stream according to the E-TFCI''$_1$ and the reference E-TFC set; calculate, when inter-stream interference is considered, an equivalent transmit power offset $A'_{edm2}^2$ of the secondary stream according to the SD and the $A''_{edm1}^2$; and calculate, when inter-stream interference is considered and the transmit power offset of the secondary stream is $A''_{ed}^2$, a second transport format combination indicator E-TFCI'$_2$ of the secondary stream according to the $A'_{edm2}^2$ and the reference E-TFC set; or a seventh calculating unit, configured to, when, within the TTI, the transmit power offset $A''_{ed}^2$ of the secondary stream is not equal to the first transmit power offset $A_{ed}^2$ of the primary stream granted by the base station, and the user equipment receives the dual-stream channel quality difference SD sent by the base station, calculate the equivalent transmit power offset $A_{edm2}^2$ of the secondary stream according to the $A_{ed}^2$, the primary-stream channel quality difference, and the SD; calculate, when inter-stream interference is considered, an equivalent transmit power offset $A'_{edm2}^2$ of the secondary stream according to the $A_{edm2}^2$, the $A''_{ed}^2$, and the $A_{ed}^2$; and calculate, when inter-stream interference is considered and the transmit power offset of the secondary stream is $A''_{ed}^2$, a second transport format combination indicator E-TFCI'$_2$ of the secondary stream according to the $A_{ed}^2$ and the reference E-TFC set.

Specifically, the second calculating unit may include:

an eighth calculating module, configured to calculate the equivalent transmit power offset $A''_{edm1}^2$ of the primary stream according to the reference E-TFC set and the E-TFCI''$_1$; and a ninth calculating module, configured to calculate the transmit power offset $A''_{ed}^2$ of the secondary stream according to the $A''_{edm1}^2$, the $A_{ed}^2$, and the primary-stream channel quality difference.

The ninth calculating module is specifically configured to calculate the transmit power offset $A''_{ed}^2$ of the secondary stream by using the following formula:

$$A''_{ed}{}^2 = \frac{A_{ed}^2 A''_{edm1}{}^2}{A_{ed}^2 - A''_{edm1}{}^2(\delta_1 - 1)}.$$

Specifically, the fourth calculating unit includes:

a tenth calculating module, configured to calculate the equivalent transmit power offset $A_{edm2}^2$ of the secondary stream according to the $A_{ed}^2$, the primary-stream channel quality difference, and the SD; and an eleventh calculating module, configured to calculate, when inter-stream interference is considered and the transmit power offset of the secondary stream is $A_{ed}^2$, the first transport format combination indicator E-TFCI$_2$ of the secondary stream according to the $A_{edm2}^2$ and the reference E-TFC set.

When the primary-stream channel quality difference is the primary-stream grant offset $\delta_1$ and the SD is a dual-stream channel quality ratio $\delta_2$, the $\delta_2$ is a linear value. If the dual-stream channel quality difference SD that is sent by the base station and received by the user equipment is a log value $\delta_{l2}$, the $\delta_{l2}$ is converted into the linear value $\delta_2$ according to the formula $$\delta_2 = 10^{\frac{\delta_{l2}}{10}};$$

or if the dual-stream channel quality difference SD is an offset in a serving grant SG quantization table, the offset is converted into the linear value $\delta_2$. The eleventh calculating module is specifically configured to calculate the equivalent transmit power offset $A_{edm2}^2$ of the secondary stream by using the following formula:

$$A_{edm2}^2 = \frac{A_{ed}^2}{\delta_2 \times \delta_1}.$$

Specifically, the fifth calculating unit is configured to calculate, when inter-stream interference is considered, the equivalent transmit power offset $A'_{edm2}^2$ of the secondary stream by using the following formula:

$$A'_{edm2}{}^2 = \frac{A''_{ed}{}^2 A_{edm2}^2}{A_{ed}^2}.$$

Specifically, the sixth calculating unit is specifically configured to calculate, when inter-stream interference is considered, the equivalent transmit power offset $A'_{edm2}^2$ of the secondary stream by using the following formula:

$$A'^2_{edm2} = \frac{A''^2_{ed} A^2_{edm2}}{A^2_{ed}}.$$

Specifically, when the SD is the dual-stream channel quality ratio $\delta_2$, the sixth calculating unit is specifically configured to calculate, when inter-stream interference is considered, the equivalent transmit power offset $A'^2_{edm2}$ of the secondary stream by using the following formula:

$$A'^2_{edm2} = \frac{A''^2_{edm1}}{\delta_2}.$$

Specifically, when the primary-stream channel quality difference is the primary-stream grant offset $\delta_1$ and the SD is the dual-stream E-TFCI offset $\delta_{t2}$, the fourth calculating unit includes:

a twelfth calculating module, configured to calculate, when inter-stream interference is considered and the transmit power offset of the primary stream is $A_{ed}^2$, the first transport format combination indicator E-TFCI$_1$ of the primary stream according to the grant offset $\delta_1$ of the primary stream and the $A_{ed}^2$; and a thirteenth calculating module, configured to calculate, when inter-stream interference is considered and the transmit power offset of the secondary stream is $A_{ed}^2$, the first transport format combination indicator E-TFCI$_2$ of the secondary stream by using the following formula:

E-TFCI$_2$=E-TFCI$_1$–$\delta_{t2}$.

Specifically, when the primary-stream channel quality difference is the primary-stream grant offset $\delta_1$ and the SD is the dual-stream E-TFCI offset $\delta_{t2}$, the seventh calculating unit includes:

a fourteenth calculating module, configured to calculate, when inter-stream interference is considered and the transmit power offset of the primary stream is $A_{ed}^2$, the equivalent transmit power offset $A_{edm1}^2$ of the primary stream by using the following formula:

$$A^2_{edm1} = \frac{A^2_{ed}}{\delta_1};$$

a fifteenth calculating module, configured to calculate, when inter-stream interference is considered and the transmit power offset of the primary stream is $A_{ed}^2$, the first transport format combination indicator E-TFCI$_1$ of the primary stream according to the $A_{edm1}^2$ and the reference E-TFC set;

a sixteenth calculating module, configured to calculate, when inter-stream interference is considered and the transmit power offset of the secondary stream is $A_{ed}^2$, the first transport format combination indicator E-TFCI$_2$ of the secondary stream by using the following formula:

E-TFCI$_2$=E-TFCI$_1$–$\delta_{t2}$; and a seventeenth calculating module, configured to calculate the equivalent transmit power offset $A_{edm2}^2$ of the secondary stream according to the E-TFCI$_2$ and the reference E-TFC set.

It should be noted that, information exchange between modules/units of the foregoing apparatus, execution procedures, and the like are based on the concept of the method embodiments of the present invention, and technical effects thereof are the same as the embodiments of the present invention. For details, reference may be made to description of a method embodiment shown in FIG. 1 of the present invention, and details are not described herein again.

It can be learned from the foregoing embodiment that, a user equipment receives a reference E-TFC set sent by a base station and a channel quality difference, which is in a dual-stream transmission mode of an ULMIMO system and is sent by the base station, of a primary stream. Then the user equipment acquires, according to a primary-stream serving grant allocated to the user equipment by the base station within a transmission time interval TTI, a first transmit power offset $A_{ed}^2$ of the primary stream granted by the base station. Finally, the user equipment calculates, when inter-stream interference is considered, an E-TFCI$_1$ or an E-TFCI'$_1$ separately according to a difference, that is, whether transmit power of the primary stream is based on primary-stream transmit power granted by the base station or is based on remaining transmit power. Finally, based on the E-TFCI$_1$ and the E-TFCI'$_1$, the user equipment selects an indicator, which has a smaller value, an E-TFCI"$_1$, and the user equipment selects a transmission block size that corresponds to the E-TFCI"$_1$. This transmission block size can be applied to the dual-stream transmission mode of the ULMIMO system.

Figure 8:
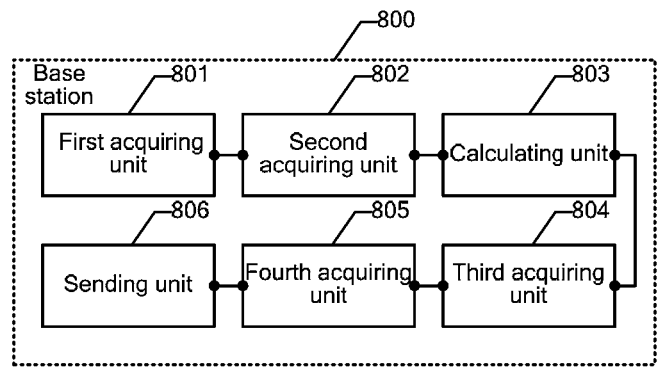
FIG. 8 is a schematic structural diagram of a base station according to an embodiment of the present invention.

The following describes a base station. Referring to FIG. 8, the base station 800 includes:

a first acquiring unit 801, configured to acquire, when inter-stream interference is not considered, a balanced signal interference noise ratio SINR$_c$ of a dedicated physical control channel DPCCH;

a second acquiring unit 802, configured to acquire, according to a primary-stream serving grant SG allocated to a user equipment within a transmission time interval TTI, a first transmit power offset $A_{ed}^2$ of the primary stream granted by the base station;

a calculating unit 803, configured to calculate, according to the $A_{ed}^2$ and the SINR$_c$ when inter-stream interference is not considered, a signal interference noise ratio SINR$_s$ of the primary stream in a dual-stream transmission mode of an ULMIMO system;

a third acquiring unit 804, configured to acquire, when inter-stream interference is considered, a signal interference noise ratio SINR$_1$ of the primary stream in the dual-stream transmission mode of the ULMIMO system;

a fourth acquiring unit 805, configured to acquire a primary-stream channel quality difference according to the SINR$_s$ and the SINR$_1$, where the primary-stream channel quality difference is a primary-stream grant offset $\delta_1$; and a sending unit 806, configured to send, to the user equipment, a reference E-TFC set and the primary-stream channel quality difference in the dual-stream transmission mode of the uplink multiple-input multiple-output ULMIMO system.

Specifically, the fourth acquiring unit 805 is specifically configured to acquire the grant offset $\delta_1$ of the primary stream by using the following formula:

$$\delta_1 = \frac{SINR_s}{SINR_1}.$$

If the primary-stream grant offset is a log value $\delta_{l1}$, the $\delta_{l1}$ is calculated, according to a formula $$\delta_{l1} = 10\log(\delta_1) = 10\log\left(\frac{SINR_s}{SINR_1}\right).$$

Alternatively, if the primary-stream grant offset is an offset in a serving grant SG quantization table, a linear value $\delta_1$ is calculated first, and then this offset is obtained, by conversion, according to the linear value $\delta_1$.

It should be noted that, the base station 800 further includes the following units (not shown in FIG. 8):

a fifth acquiring unit, configured to acquire, when inter-stream interference is considered, a signal interference noise ratio $SINR_2$ of a secondary stream in the dual-stream transmission mode of the ULMIMO system; and a sixth acquiring unit, configured to acquire a dual-stream channel quality difference SD according to the $SINR_2$ and the $SINR_1$, where the SD is a dual-stream channel quality ratio $\delta_2$.

The sending unit is further configured to send the SD to the user equipment.

Specifically, the sixth acquiring unit is specifically configured to acquire the $\delta_2$ by using the following formula:

$$\delta_2 = \frac{SINR_1}{SINR_2}.$$

If the dual-stream channel quality difference SD that is sent by the base station and received by the user equipment is a log value $\delta_{l2}$, the $\delta_{l2}$ is obtained, by conversion, according to a formula $$\delta_{l2} = 10\log(\delta_2) = 10\log\left(\frac{SINR_1}{SINR_2}\right).$$

Alternatively, if the dual-stream channel quality difference SD is an offset in a serving grant SG quantization table, a linear value $\delta_2$ is calculated first, and then this offset is obtained, by conversion, according to the linear value $\delta_2$.

It should be noted that, information exchange between modules/units of the foregoing apparatus, execution procedures, and the like are based on the concept of the method embodiments of the present invention, and technical effects thereof are the same as the embodiments of the present invention. For details, reference may be made to description of a method embodiment shown in FIG. 5 of the present invention, and details are not described herein again.

In this embodiment of the present invention, a base station separately acquires an $SINR_s$ and an $SINR_1$, and then sends, to a user equipment, a reference E-TFC set and a primary-stream channel quality difference in a dual-stream transmission mode of an ULMIMO system. Because inter-stream interference is considered when the $SINR_s$ and the $SINR_1$ are separately acquired, the user equipment can implement transmission of uplink data after receiving the primary-stream channel quality difference. Transmission of uplink data can be applied to the dual-stream transmission mode of the ULMIMO system.

Figure 9:
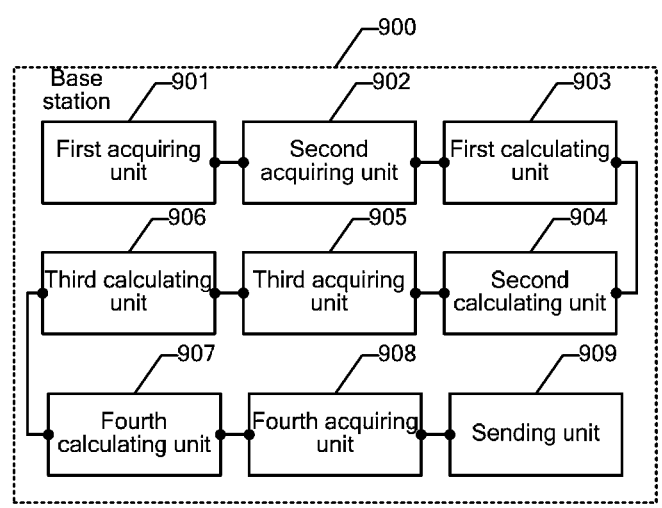
FIG. 9 is a schematic structural diagram of another base station according to an embodiment of the present invention.

The following describes another base station. Referring to FIG. 9, the base station 900 includes:

a first acquiring unit 901, configured to acquire, when inter-stream interference is not considered, a balanced signal interference noise ratio $SINR_c$ of a dedicated physical control channel DPCCH;

a second acquiring unit 902, configured to acquire, according to a primary-stream serving grant SG allocated to a user equipment within a transmission time interval TTI, a first transmit power offset $A_{ed}^2$ of the primary stream granted by the base station;

a first calculating unit 903, configured to calculate, according to the $A_{ed}^2$ and the $SINR_c$ when inter-stream interference is not considered, a signal interference noise ratio $SINR_s$ of the primary stream in a dual-stream transmission mode of an ULMIMO system;

a second calculating unit 904, configured to calculate, according to a reference E-TFC set and the $A_{ed}^2$, a fourth transport format combination indicator $E\text{-}TFCI_s$ that is of the primary stream and corresponds to the $SINR_s$;

a third acquiring unit 905, configured to acquire, when inter-stream interference is considered, a signal interference noise ratio $SINR_1$ of the primary stream in the dual-stream transmission mode of the ULMIMO system;

a third calculating unit 906, configured to calculate, when inter-stream interference is considered and a transmit power offset of the primary stream is $A_{ed}^2$, an equivalent transmit power offset $A_{edm1}^2$ of the primary stream according to the $SINR_1$ and the $SINR_c$;

a fourth calculating unit 907, configured to calculate, according to the $A_{edm1}^2$ and the reference E-TFC set, a first transport format combination indicator $E\text{-}TFCI_1$ that is of the primary stream and corresponds to the $SINR_1$;

a fourth acquiring unit 908, configured to acquire a primary-stream channel quality difference according to the $E\text{-}TFCI_s$ and the $E\text{-}TFCI_1$, where the primary-stream channel quality difference is a primary-stream E-TFCI offset $\delta_{t1}$; and a sending unit 909, configured to send, to the user equipment, the reference E-TFC set and the primary-stream channel quality difference in the dual-stream transmission mode of the uplink multiple-input multiple-output ULMIMO system.

Specifically, the fourth acquiring unit 908 is specifically configured to acquire the E-TFCI offset $\delta_{t1}$ of the primary stream by using the following formula:

$$\delta_{t1} = E\text{-}TFCI_s - E\text{-}TFCI_1.$$

It should be noted that, the base station 900 may further include (not shown in FIG. 9):

a fifth acquiring unit, configured to, when, within the TTI, a transmit power offset of a secondary stream is equal to the first transmit power offset $A_{ed}^2$ of the primary stream granted to the user equipment, acquire, when inter-stream interference is considered and the transmit power offset of the secondary stream is $A_{ed}^2$, a signal interference noise ratio $SINR_2$ of the secondary stream; and a fifth calculating unit, configured to calculate, when inter-stream interference is considered and the transmit power offset of the secondary stream is $A_{ed}^2$, an equivalent transmit power offset $A_{edm2}^2$ of the secondary stream according to the $SINR_2$ and the $SINR_c$.

The sending unit is further configured to send, to the user equipment, the equivalent transmit power offset $A_{edm2}^2$ that is of the secondary stream and is in the dual-stream transmission mode of the ULMIMO system.

Specifically, the fifth calculating unit is specifically configured to calculate, when inter-stream interference is considered and the transmit power offset of the secondary stream is $A_{ed}^2$, the equivalent transmit power offset $A_{edm2}^2$ of the secondary stream by using the following formula:

$$A_{edm2}^2 = \frac{SINR_2}{SINR_c} \cdot A_{ed}^2.$$

It should be noted that, the base station 900 may further include (not shown in FIG. 9):

a sixth calculating unit, configured to calculate, according to the $A_{edm2}^2$ and the reference E-TFC set, a first transport format combination indicator $E\text{-}TFCI_2$ that is of the secondary stream and corresponds to the $SINR_1$; and a sixth acquiring unit, configured to acquire a dual-stream channel quality difference according to the $E\text{-}TFCI_2$ and the $E\text{-}TFCI_1$, where the dual-stream channel quality difference is a dual-stream E-TFCI offset $\delta_{t2}$.

The sending unit is further configured to send the dual-stream channel quality difference to the user equipment.

Specifically, the sixth acquiring unit is specifically configured to calculate the dual-stream E-TFCI offset $\delta_{t2}$ by using the following formula:

$\delta_{t2} = E\text{-}TFCI_1 - E\text{-}TFCI_2$.

It should be noted that, information exchange between modules/units of the foregoing apparatus, execution procedures, and the like are based on the concept of the method embodiments of the present invention, and technical effects thereof are the same as the embodiments of the present invention. For details, reference may be made to description of a method embodiment shown in FIG. 6 of the present invention, and details are not described herein again.

In this embodiment of the present invention, a base station separately acquires an $E\text{-}TFCI_s$ and an $E\text{-}TFCI_1$, and then sends, to a user equipment, a reference E-TFC set and a primary-stream channel quality difference in a dual-stream transmission mode of an ULMIMO system. Because inter-stream interference is considered when the $E\text{-}TFCI_s$ and the $E\text{-}TFCI_1$ are separately acquired, the user equipment can implement transmission of uplink data after receiving the primary-stream channel quality difference. Transmission of uplink data can be applied to the dual-stream transmission mode of the ULMIMO system.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

The foregoing describes in detail an E-TFC selection method and a related method and a device that are provided by the present invention, and a person of ordinary skill in the art may make variations to specific implementation manners and the application scope without departing from the idea of the embodiments of the present invention. In conclusion, the content of this specification shall not be understood as a limitation on the present invention.

What is claimed is:

1. A method for selecting a transport format in an uplink multiple-input multiple-output (ULMIMO) system, comprising:

receiving, by a user equipment (UE), a reference enhanced dedicated channel transport format combination (E-TFC) set and a primary-stream channel quality difference in a dual-stream transmission mode that are sent by a base station;

acquiring, by the user equipment according to a primary-stream serving grant (SG) allocated by the base station to the user equipment within a transmission time interval (TTI), a first transmit power offset $A_{ed}^2$ of a primary stream granted by the base station;

when transmit power of the primary stream is obtained according to primary-stream transmit power granted by the base station, acquiring, by the user equipment, when inter-stream interference is considered and a transmit power offset of the primary stream is the first transmit power offset $A_{ed}^2$, a first transport format combination indicator $E\text{-}TFCI_1$ of the primary stream according to the primary-stream channel quality difference and the first transmit power offset $A_{ed}^2$;

when the transmit power of the primary stream is obtained according to remaining transmit power, which is calculated according to a limit value of maximum transmit power of the user equipment, calculating, by the user equipment, a second transmit power offset $A'^2_{ed}$ of the primary stream according to the remaining transmit power, and calculating, when inter-stream interference is considered and the transmit power offset of the primary stream is the second transmit power offset $A'^2_{ed}$, an equivalent transmit power offset $A'^2_{edm1}$ of the primary stream according to the primary-stream channel quality difference, the first transmit power offset $A_{ed}^2$, and the second transmit power offset $A'^2_{ed}$; and calculating, by the user equipment, when inter-stream interference is considered and the transmit power offset of the primary stream is the second transmit power offset $A'^2_{ed}$, a second transport format combination indicator $E\text{-}TFCI'_1$ of the primary stream according to the reference E-TFC set and the equivalent transmit power offset $A'^2_{edm\,1}$, and selecting, by the user equipment from the first transport format combination indicator $E\text{-}TFCI_1$ and the second transport format combination indicator $E\text{-}TFCI'_1$, an indicator, which has a smaller value, as a third transport format combination indicator $E\text{-}TFCI''_1$ of the primary stream corresponding to a transport foimat used by the user equipment to send uplink data.

2. The selection method according to claim 1, wherein when the primary-stream channel quality difference is a primary-stream grant offset $\delta_1$, the acquiring, by the user equipment, when inter-stream interference is considered and a transmit power offset of the primary stream is the first transmit power offset $A_{ed}^2$, a first transmission format combination indicator $E\text{-}TFCI_1$ of the primary stream according to the primary-stream channel quality difference and the the first transmit power offset $A_{ed}^2$ comprises:

calculating, by the user equipment, when inter-stream interference is considered and the transmit power offset of the primary stream is the first transmit power offset $A_{ed}^2$, an equivalent transmit power offset $A_{edm1}^2$ of the primary stream by using the following formula:

$$A_{edm1}^2 = \frac{A_{ed}^2}{\delta_1};$$

and acquiring, by the user equipment, when inter-stream interference is considered and the transmit power offset of the primary stream is $A_{ed}^2$, the first transmission format combination indicator E-TFCI$_1$ according to the reference E-TFC set and the equivalent transmit power offset A$_{edm1}^2$.

3. The selection method according to claim 1, wherein when the primary-stream channel quality difference is a primary-stream E-TFCI offset $\delta_{t1}$, the acquiring, by the user equipment, when inter-stream interference is considered and a transmit power offset of the primary stream is the first transit power offset A$_{ed}^2$, the first transmission format combination indicator E-TFCI$_1$ of the primary stream according to the primary-stream channel quality difference and the the first transmit power offset A$_{ed}^2$ comprises:

calculating, by the user equipment, when inter-stream interference is not considered, a fourth transport format combination indicator E-TFCI$_s$ of the primary stream according to the reference E-TFC set and the first transmit power offset A$_{ed}^2$; and calculating, by the user equipment, when inter-stream interference is considered and the transmit power offset of the primary stream is the first transmit power offset A$_{ed}^2$, the E-TFCI$_1$ using the following formula:

E-TFCI$_1$=E-TFCI$_s$-$\delta_{t1}$.

4. The selection method according to claim 1, wherein when the primary-stream channel quality difference is the primary-stream grant offset $\delta_1$, the calculating, by the user equipment, when inter-stream interference is considered and the transmit power offset of the primary stream is the second transmit power offset A'$_{ed}^2$, the equivalent transmit power offset A'$_{edm1}^2$ of the primary stream according to the primary-stream channel quality difference, the first transit power offset A$_{ed}^2$, and the second transmit power offset A'$_{ed}^2$ includes:

calculating, by the user equipment, when inter-stream interference is considered and the transmit power offset of the primary stream is the second transmit power offset A'$_{ed}^2$, the equivalent transmit power offset A'$_{edm1}^2$ of the primary stream using the following formula:

$$A'^2_{edm1} = \frac{A^2_{ed} A'^2_{ed}}{A^2_{ed} + A'^2_{ed}(\delta_1 - 1)}.$$

5. The selection method according to claim 1, wherein when the primary-stream channel quality difference is the primary-stream E-TFCI offset $\delta_{t1}$, the calculating, by the user equipment, when inter-stream interference is considered and the transmit power offset of the primary stream is A'$_{ed}^2$, the equivalent transmit power offset A'$_{edm1}^2$ of the primary stream according to the primary-stream channel quality difference, the the first transmit power offset A$_{ed}^2$, and the second transmit power offset A'$_{ed}^2$ comprises:

calculating, by the user equipment, when inter-stream interference is not considered, the E-TFCI$_s$ according to the reference E-TFC set and the first transmit power offset A$_{ed}^2$;

calculating, by the user equipment, when inter-stream interference is considered and the transmit power offset of the primary stream is the first transmit power offset A$_{ed}^2$, the E-TFCI$_1$ using the following formula:

E-TFCI$_1$=E-TFCI$_s$-$\delta_{t1}$;

calculating, by the user equipment, when inter-stream interference is considered and the transmit power offset of the primary stream is the first transmit power offset A$_{ed}^2$, the equivalent transmit power offset A$_{edm1}^2$ of the primary stream according to the reference E-TFC set and the E-TFCI$_1$;

calculating, by the user equipment, the primary-stream grant offset $\delta_1$ using the following formula:

$$\delta_1 = \frac{A^2_{ed}}{A^2_{edm1}};$$

and calculating, by the user equipment, when inter-stream interference is considered and the transmit power offset of the primary stream is the second transmit power offset A'$_{ed}^2$, the equivalent transmit power offset A'$_{ed}^2$, of the primary stream using the following formula:

$$A'^2_{edm1} = \frac{A^2_{ed} A'^2_{ed}}{A^2_{ed} + A'^2_{ed}(\delta_1 - 1)}.$$

6. The selection method according to claim 1, wherein the user equipment receives, using a physical layer, the primary-stream channel quality difference in the dual-stream transmission mode of an ULMIMO system that is sent by the base station.

7. A method for sending a primary-stream channel quality difference, comprising:

acquiring, by a base station, when inter-stream interference is not considered, a balanced signal interference noise ratio SINR$_C$ of a dedicated physical control channel (DPCCH);

acquiring, by the base station, according to a primary-stream serving grant (SG) allocated to a user equipment within a transmission time interval (TTI), a first transmit power offset A$_{ed}^2$ of a primary stream granted by the base station;

calculating, by the base station according to the a first transmit power offset A$_{ed}^2$ and the balanced signal interference noise ratio SINR$_c$ when inter-stream interference is not considered, a first signal interference noise ratio SINR$_s$ of the primary stream in a dual-stream transmission mode of an uplink multiple-input multiple-output (ULMIMO) system;

acquiring, by the base station, when inter-stream interference is considered, a second signal interference noise ratio SINR$_1$ of the primary stream in the dual-stream transmission mode of the ULMIMO system;

acquiring, by the base station, the primary-stream channel quality difference according to the first SINR$_s$ and the second SINR$_1$, wherein the primary-stream channel quality difference is a primary-stream grant offset $\delta_1$; and sending, by the base station to the user equipment, a reference E-TFC set and the primary-stream channel quality difference in the dual-stream transmission mode of the ULMIMO system.

8. The method for sending a primary-stream channel quality difference according to claim 7, wherein the acquiring, by the base station, the primary-stream channel quality difference according to the first SINR$_s$ and the second SINR$_1$, includes:

acquiring, by the base station, the primary-stream grant offset $\delta_1$ using the following formula:

$$\delta_1 = \frac{SINR_s}{SINR_1}.$$

9. The method for sending a primary-stream channel quality difference according to claim 7, wherein after the acquiring, by the base station, the primary-stream channel quality difference according to the first $SINR_s$ and the second $SINR_1$, the method further comprises:
acquiring, by the base station, when inter-stream interference is considered, a third signal interference noise ratio $SINR_2$ of a secondary stream in the dual-stream transmission mode of the ULMIMO system;
acquiring, by the base station, a dual-stream channel quality difference (SD) according to the third $SINR_2$ and the second $SINR_1$, wherein the SD is a dual-stream channel quality ratio $\delta_2$; and
sending, by the base station, the SD to the user equipment.

10. The method for sending a primary-stream channel quality difference according to claim 9, wherein the acquiring, by the base station, a dual-stream channel quality difference SD according to the third $SINR_2$ and the second $SINR_1$ includes:
acquiring, by the base station, the $\delta_2$ using the following formula:

$$\delta_2 = \frac{SINR_1}{SINR_2}.$$

11. A method for sending a primary-stream channel quality difference, comprising:
acquiring, by a base station, when inter-stream interference is not considered, a balanced signal interference noise ratio $SINR_c$ of a dedicated physical control channel (DPCCH);
acquiring, by the base station, according to a primary-stream serving grant (SG) allocated to a user equipment within a transmission time interval (TTI), a first transmit power offset $A_{ed}^2$ of a primary stream granted by the base station;
calculating, by the base station according to the first transmit power offset $A_{ed}^2$ and the balanced signal interference noise ratio $SINR_c$ when inter-stream interference is not considered, a first signal interference noise ratio $SINR_s$ of the primary stream in a dual-stream transmission mode of an uplink multiple-input multiple-output (ULMIMO) system;
calculating, by the base station, according to a reference enhanced dedicated channel transport format combination (E-TFC) set and the first transmit power offset $A_{ed}^2$, a fourth transport format combination indicator $E\text{-}TFCI_s$ corresponding to the $SINR_s$;
acquiring, by the base station, when inter-stream interference is considered, a second signal interference noise ratio $SINR_1$ of the primary stream in the dual-stream transmission mode of the ULMIMO system;
calculating, by the base station, when inter-stream interference is considered and a transmit power offset of the primary stream is the first transmit power offset $A_{ed}^2$, an equivalent transmit power offset $A_{edm1}^2$ of the primary stream according to the second $SINR_1$ and the $SINR_c$;
calculating, by the base station according to the equivalent transmit power offset $A_{edm1}^2$ and the reference E-TFC set, a first transport format combination indicator $E\text{-}TFCI_1$, corresponding to the second $SINR_1$, of the primary stream;
acquiring, by the base station, the primary-stream channel quality difference according to the $E\text{-}TFCI_s$ and the $E\text{-}TFCI_1$, wherein the primary-stream channel quality difference is a primary-stream E-TFCI offset $\delta_{t1}$; and
sending, by the base station to the user equipment, the reference E-TFC set and the primary-stream channel quality difference in the dual-stream transmission mode of the ULMIMO system.

12. The method for sending a primary-stream channel quality difference according to claim 11, wherein the acquiring, by the base station, the primary-stream channel quality difference according to the $E\text{-}TFCI_s$ and the $E\text{-}TFCI_1$ includes:
acquiring, by the base station, the primary-stream E-TFCI offset $\delta_{t1}$ using the following formula:

$$\delta_{t1} = E\text{-}TFCI_s - E\text{-}TFCI_1.$$

13. The method for sending a primary-stream channel quality difference according to claim 11, wherein after the acquiring, by the base station, the primary-stream channel quality difference according to the $E\text{-}TFCI_s$, and the $E\text{-}TFCI_1$, the method further comprises:
if, within the TTI, a transmit power offset of a secondary stream is equal to the first transmit power offset $A_{ed}^2$ of the primary stream granted to the user equipment, acquiring, by the base station, when inter-stream interference is considered and the transmit power offset of the secondary stream is the first transmit power offset $A_{ed}^2$, a third signal interference noise ratio $SINR_2$ of the secondary stream;
calculating, by the base station, when inter-stream interference is considered and the transmit power offset of the secondary stream is the first transmit power offset $A_{ed}^2$, an equivalent transmit power offset $A_{edm2}^2$ of the secondary stream according to the third $SINR_2$ and the $SINR_c$; and
sending, by the base station to the user equipment, the equivalent transmit power offset $A_{edm2}^2$ of the secondary stream in the dual-stream transmission mode of the ULMIMO system.

14. The method for sending a primary-stream channel quality difference according to claim 13, wherein the calculating, by the base station, when inter-stream interference is considered and the transmit power offset of the secondary stream is the first transmit power offset $A_{ed}^2$, the equivalent transmit power offset $A_{edm2}^2$ of the secondary stream according to the third $SINR_2$ and the $SINR_c$ includes:
calculating, by the base station when inter-stream interference is considered and the transmit power offset of the secondary stream is the first transmit power offset $A_{ed}^2$, the equivalent transmit power offset $A_{edm2}^2$ of the secondary stream using the following formula:

$$A_{edm2}^2 = \frac{SINR_2}{SINR_c}.$$

15. The method for sending a primary-stream channel quality difference according to claim 13, wherein after the calculating, by the base station, when inter-stream interference is considered and the transmit power offset of the secondary stream is the first transmit power offset $A_{ed}^2$, the equivalent transmit power offset $A_{edm}^2$ of the secondary stream according to the third $SINR_2$ and the $SINR_c$, the method further comprises:

calculating, by the base station according to the equivalent transmit power offset $A_{edm2}^2$ and the reference E-TFC set, a first transport format combination indicator $E\text{-}TFCI_2$, corresponding to the second $SINR_1$, of the secondary stream;

acquiring, by the base station, a dual-stream channel quality difference according to the $E\text{-}TFCI_2$ and the $E\text{-}TFCI_1$, wherein the dual-stream channel quality difference is a dual-stream E-TFCI offset $\delta_{t2}$; and sending, by the base station to the user equipment, the dual-stream channel quality difference.

16. The method for sending a primary-stream channel quality difference according to claim 15, wherein the acquiring, by the base station, a dual-stream channel quality difference according to the $E\text{-}TFCI_2$ and the $E\text{-}TFCI_1$ includes:

calculating, by the base station, the dual-stream E-TFCI offset $\delta_{t2}$ using the following formula:

$$\delta_{t2} = E\text{-}TFCI_1 - E\text{-}TFCI_2.$$

17. The method for sending a primary-stream channel quality difference according to claim 11, wherein the base station sends, to the user equipment, using a physical layer, the primary-stream channel quality difference in the dual-stream transmission mode of the ULMIMO system.

18. A user equipment, wherein the user equipment comprises:

a receiving unit, configured to receive a reference enhanced dedicated channel transport format combination (E-TFC) set and a primary-stream channel quality difference in a dual-stream transmission mode of an uplink multiple-input multiple-output (ULMIMO) system that are sent by a base station;

a first acquiring unit, configured to acquire, according to a primary-stream serving grant (SG) allocated to the user equipment by the base station within a transmission time interval (TTI), a first transmit power offset $A_{ed}^2$ of the primary stream granted by the base station;

a second acquiring unit, configured to: when transmit power of the primary stream is obtained according to primary-stream transmit power granted by the base station, acquire, when inter-stream interference is considered and a transmit power offset of the primary stream is the first transmit power offset $A_{ed}^2$; a first transport format combination indicator $E\text{-}TFCI_1$ of the primary stream according to the primary-stream channel quality difference and the first transmit power offset $A_{ed}^2$;

a third acquiring unit, configured to: when the transmit power of the primary stream is obtained according to remaining transmit power, which is calculated according to a limit value of maximum transmit power of the user equipment, calculate a second transmit power offset $A'^2_{ed}$, of the primary stream according to the remaining transmit power; calculate, when inter-stream interference is considered and the transmit power offset of the primary stream is the second transmit power offset $A'^2_{ed}$; an equivalent transmit power offset $A'^2_{edm1}$ of the primary stream according to the primary-stream channel quality difference, the first transmit power offset $A_{ed}^2$ and the second transmit power offset $A'^2_{ed}$; and calculate, when inter-stream interference is considered and the transmit power offset of the primary stream is the second transmit power offset $A'^2_{ed}$, a second transport format combination indicator $E\text{-}TFCI'_1$ of the primary stream according to the reference E-TFC set and the equivalent transmit power offset $A'^2_{edm1}$; and a selecting unit, configured to select from the $E\text{-}TFCI_1$ and the $E\text{-}TFCI'_1$ an indicator, which has a smaller value, as a third transport format combination indicator $E\text{-}TFCI''_1$, corresponding to a transport format used by the user equipment to send uplink data, of the primary stream.

19. The user equipment according to claim 18, wherein when the primary-stream channel quality difference is a primary-stream grant offset $\delta_1$, the second acquiring unit comprises:

a first calculating module, configured to calculate, when inter-stream interference is considered and the transmit power offset of the primary stream is the first transmit power offset $A_{ed}^2$ the equivalent transmit power offset $A_{edm1}^2$ of the primary stream using the following formula:

$$A_{edm1}^2 = \frac{A_{ed}^2}{\delta_1};$$

a first acquiring module, configured to acquire, when inter-stream interference is considered and the transmit power offset of the primary stream is the first transmit power offset $A_{ed}^2$, the first transport format combination indicator $E\text{-}TFCI_1$ of the primary stream according to the reference E-TFC set and the equivalent transmit power offset $A_{edm1}^2$; and the third acquiring unit is configured to calculate, when inter-stream interference is considered and the transmit power offset of the primary stream is the second transmit power offset $A'^2_{ed}$, the equivalent transmit power offset $A'^2_{edm1}$ of the primary stream using the following formula:

$$A'^2_{edm1} = \frac{A_{ed}^2 A'^2_{ed}}{A_{ed}^2 + A'^2_{ed}(\delta_1 - 1)}.$$

20. The user equipment according to claim 18, wherein when the primary-stream channel quality difference is a primary-stream E-TFCI offset $\delta_{t1}$, the second acquiring unit comprises:

a second calculating module, configured to calculate, when inter-stream interference is not considered, a fourth transport format combination indicator $E\text{-}TFCI_s$ of the primary stream according to the reference E-TFC set and the the first transmit power offset $A_{ed}^2$;

a third calculating module, configured to calculate, when inter-stream interference is considered and the transmit power offset of the primary stream is the first transmit power offset $A_{ed}^2$, the first transport format combination indicator $E\text{-}TFCI_1$ of the primary stream using the following formula:

$E\text{-}TFCI_1 = E\text{-}TFCI_s - \delta_{t1}$; and the third acquiring unit comprises:

a third calculating module, configured to calculate, when inter-stream interference is not considered, a fourth transport format combination indicator $E\text{-}TFCI_s$ of the primary stream according to the reference E-TFC set and the the first transmit power offset $A_{ed}^2$;

a fourth calculating module, configured to calculate, when inter-stream interference is considered and the transmit power offset of the primary stream is the first transmit power offset $A_{ed}^2$; the first transport format combination indicator $E\text{-}TFCI_1$ of the primary stream using the following formula:

$$E\text{-}TFCI_1; =E\text{-}TFCI_{s-\delta t1};$$

a fifth calculating module, configured to calculate, when inter-stream interference is considered and the transmit power offset of the primary stream is the first transmit power offset $A_{ed}^2$, the equivalent transmit power offset $A_{edm1}^2$ of the primary stream according to the reference E-TFC set and the $E\text{-}TFCI_1$;

a sixth calculating module, configured to calculate a primary-stream grant offset $\delta_1$ using the following formula:

$$\delta_1 = \frac{A_{ed}^2}{A_{edm1}^2};$$

and a seventh calculating module, configured to calculate, when inter-stream interference is considered and the transmit power offset of the primary stream is the second transmit power offset $A'^2_{ed}$, the equivalent transmit power offset $A'^2_{edm1}$ of the primary stream using the following formula:

$$A'^2_{edm1} = \frac{A_{ed}^2 A'^2_{ed}}{A_{ed}^2 + A'_{ed}(\delta_1 - 1)}.$$

* * * * *

UNITED STATES PATENT AND TRADEMARK OFFICE
CERTIFICATE OF CORRECTION

PATENT NO. : 9,215,674 B2  
APPLICATION NO. : 14/486549  
DATED : December 15, 2015  
INVENTOR(S) : Yang et al.

Page 1 of 1

It is certified that error appears in the above-identified patent and that said Letters Patent is hereby corrected as shown below:

IN THE CLAIMS

Column 38, line 42, "foimat" should read -- format --.

Column 39, line 8, "first transit" should read -- first transmit --.

Column 39, line 31, "first transit" should read -- first transmit --.

Signed and Sealed this  
Fifth Day of April, 2016

Michelle K. Lee  
*Director of the United States Patent and Trademark Office*